(12) United States Patent
Prager

(10) Patent No.: US 12,497,169 B2
(45) Date of Patent: *Dec. 16, 2025

(54) PACKAGE LOADING MECHANISM

(71) Applicant: Wing Aviation LLC, Mountain View, CA (US)

(72) Inventor: Andre Prager, Sunnyvale, CA (US)

(73) Assignee: Wing Aviation LLC, Palo Alto, CA (US)

(*) Notice: Subject to any disclaimer, the term of this patent is extended or adjusted under 35 U.S.C. 154(b) by 981 days.

This patent is subject to a terminal disclaimer.

(21) Appl. No.: 17/533,574

(22) Filed: Nov. 23, 2021

(65) Prior Publication Data

US 2023/0159167 A1 May 25, 2023

Related U.S. Application Data

(63) Continuation of application No. 16/806,169, filed on Mar. 2, 2020, now Pat. No. 11,220,338, which is a
(Continued)

(51) Int. Cl.
*B64D 1/22* (2006.01)
*B64F 1/32* (2006.01)
(Continued)

(52) U.S. Cl.
CPC ............. *B64D 1/22* (2013.01); *B64F 1/32* (2013.01); *B64C 39/024* (2013.01);
(Continued)

(58) Field of Classification Search
CPC ........... B64D 1/22; B64F 1/32; B64C 39/024; B64U 2101/66; B64U 2101/60;
(Continued)

(56) References Cited

U.S. PATENT DOCUMENTS 3,270,895 A 9/1966 Stewart
3,807,577 A 4/1974 Bell
(Continued)

FOREIGN PATENT DOCUMENTS

CN 106275448 A 1/2017
EP 0 773 158 A2 5/1997
EP 2 218 642 A2 8/2010

OTHER PUBLICATIONS

The International Search Report (ISR) with Written Opinion for PCT/US2019/018203 dated May 27, 2019, pp. 1-16.
(Continued)

*Primary Examiner* — S. Joseph Morano
*Assistant Examiner* — Heaven R Buffington
(74) *Attorney, Agent, or Firm* — McDonnell Boehnen Hulbert & Berghoff LLP

(57) ABSTRACT

A payload retrieval apparatus including a stand having an upper end and a lower end, a channel having a first end and a second end, the channel coupled to the stand, a first extension that extends in a first direction from the first end of the channel, wherein the first extension is configured to direct a tether extending from a UAV and a payload retriever attached to an end of the tether toward the first end of the channel, wherein the second end of the channel has a payload engaging member positioned near the second end of the channel that is adapted to secure a payload, and wherein the payload retrieval apparatus is configured to cause the UAV to pick up the payload with the payload retriever while maintaining flying.

20 Claims, 23 Drawing Sheets

Related U.S. Application Data continuation of application No. 15/899,214, filed on Feb. 19, 2018, now Pat. No. 10,577,105.

(51) Int. Cl.
  *B64C 39/02* (2023.01)
  *B64U 101/66* (2023.01)
  *B66C 1/04* (2006.01)
  *B66C 1/34* (2006.01)

(52) U.S. Cl.
  CPC .. *B64U 2101/66* (2023.01); *B65G 2814/0398* (2013.01); *B66C 1/04* (2013.01); *B66C 1/34* (2013.01)

(58) Field of Classification Search
  CPC .... B64U 10/13; B64U 70/30; B64U 2101/64; B64U 2101/00; B65G 2814/0398; B66C 1/04; B66C 1/34
  USPC .......................................................... 258/1.2
  See application file for complete search history.

(56) References Cited

U.S. PATENT DOCUMENTS

| | | |
|---|---|---|
| 3,865,251 A | 2/1975 | Langford |
| 4,055,316 A | 10/1977 | Chipper et al. |
| 5,080,302 A | 1/1992 | Hoke |
| 6,091,161 A | 7/2000 | Dehlsen et al. |
| 7,287,724 B2 | 10/2007 | Hase |
| 8,205,835 B2 | 6/2012 | Wiley |
| 8,602,349 B2 | 12/2013 | Petrov |
| 8,973,860 B2 | 3/2015 | Beard |
| 9,174,733 B1 | 11/2015 | Burgess et al. |
| 9,387,928 B1 | 7/2016 | Gentry et al. |
| 9,561,852 B1 | 2/2017 | Beaman et al. |
| 9,573,684 B2 | 2/2017 | Kimchi et al. |
| 9,751,627 B2 | 9/2017 | Bernhardt |
| 2013/0233964 A1 | 9/2013 | Woodworth et al. |
| 2013/0306791 A1 | 11/2013 | McGeer et al. |
| 2015/0063959 A1 | 3/2015 | Saad et al. |
| 2016/0001883 A1 | 1/2016 | Sanz et al. |
| 2017/0073071 A1 | 3/2017 | Salzmann et al. |
| 2017/0121023 A1 | 5/2017 | High et al. |
| 2017/0355460 A1 | 12/2017 | Shannon et al. |
| 2020/0216174 A1* | 7/2020 | Prager ..................... B64D 1/22 |

OTHER PUBLICATIONS

International Preliminary Report on Patentability, International Application No. PCT/US2019/018203, issued Aug. 27, 2020, 10 pages.

Office Action dated Jan. 8, 2021, issued in Chinese Patent Application No. 201980013766.4, 10 pages.

\* cited by examiner

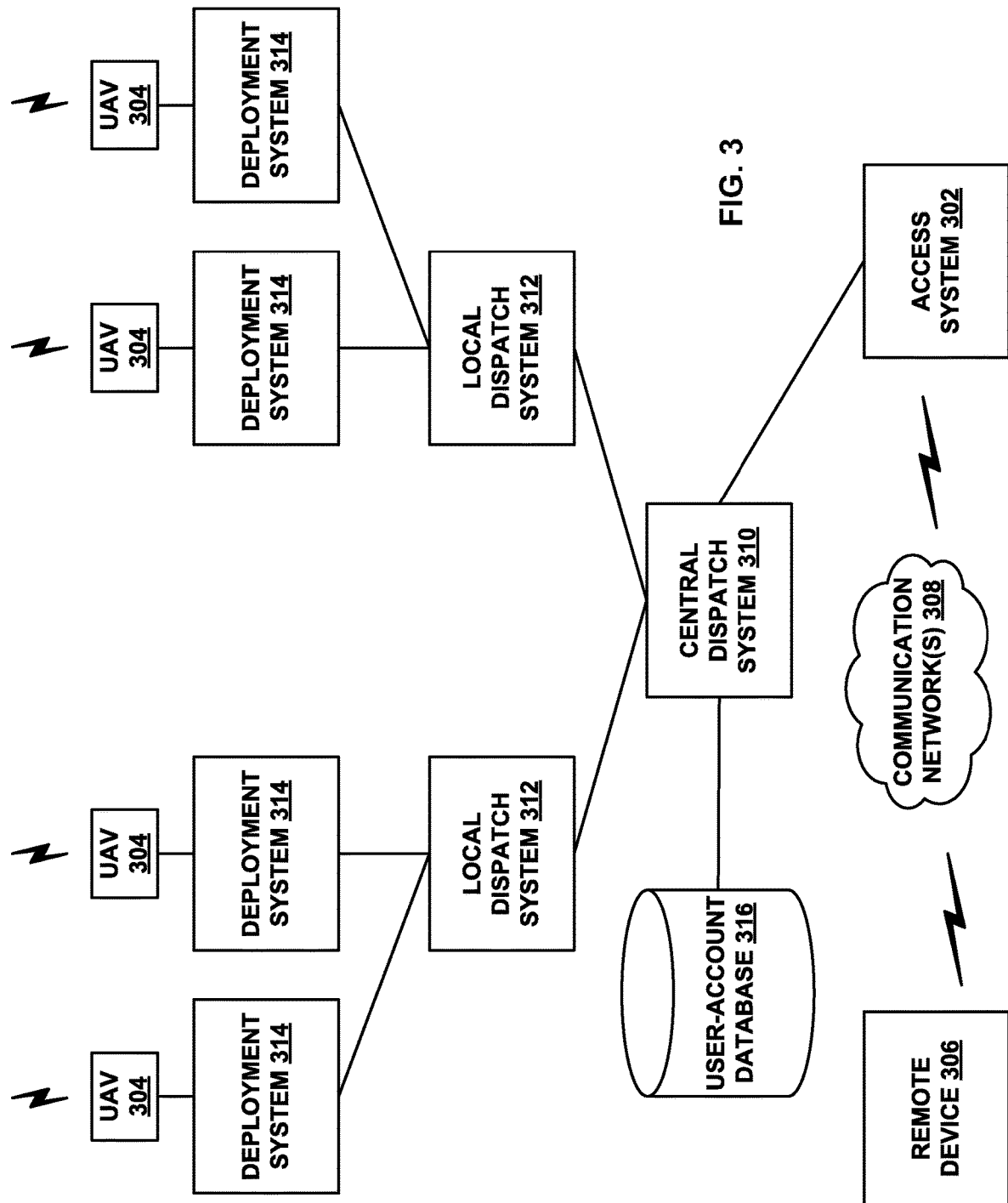

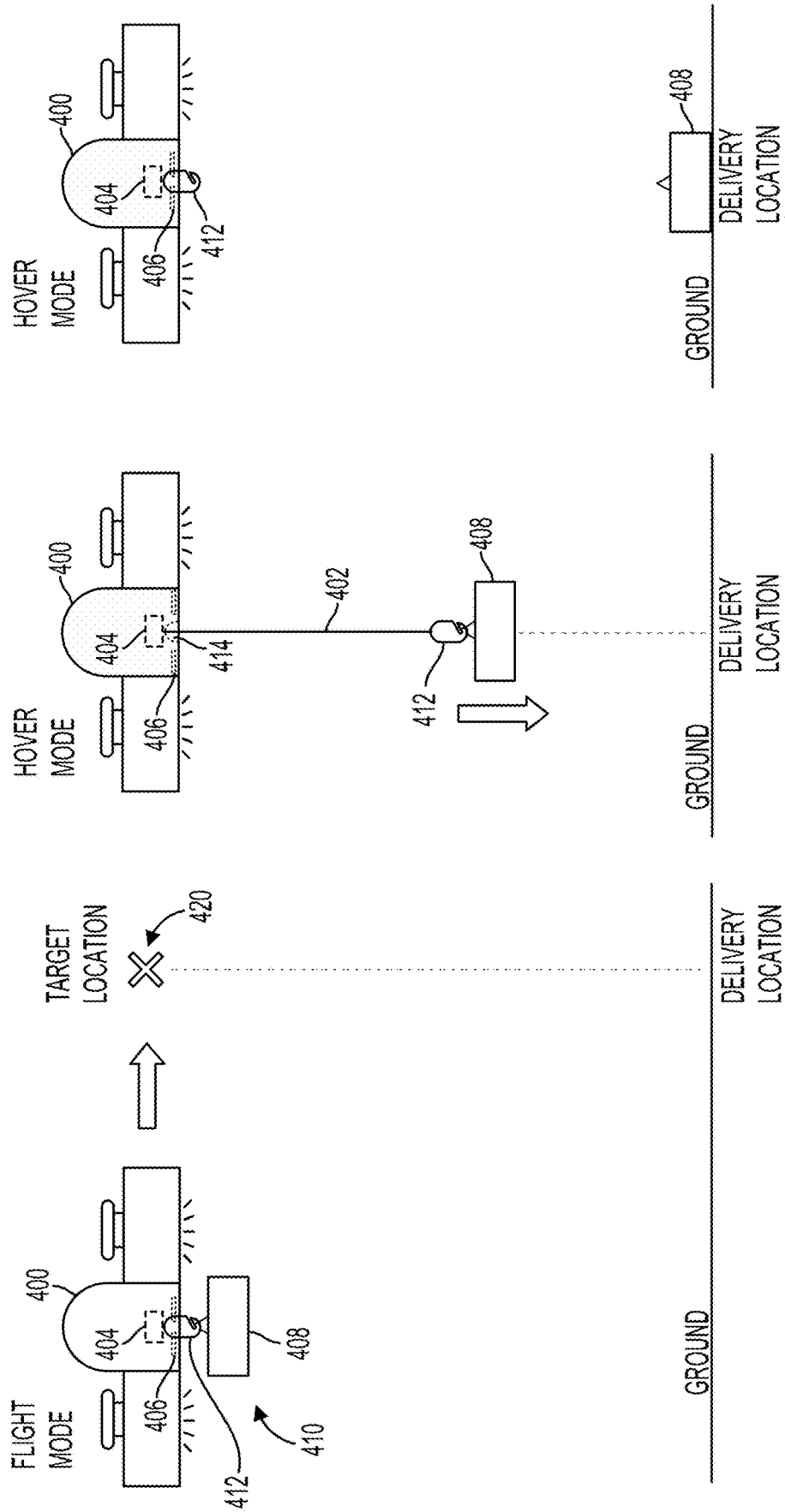

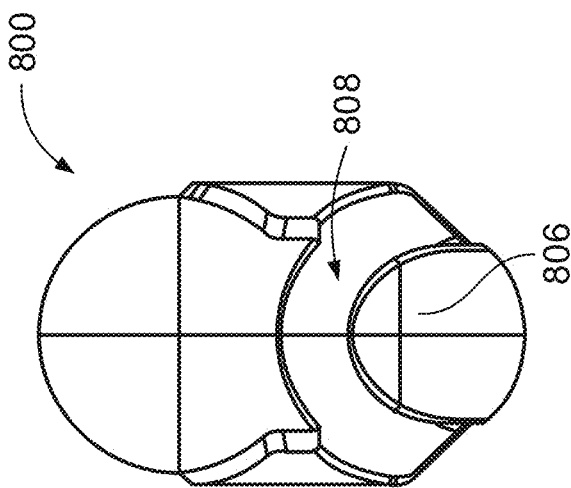
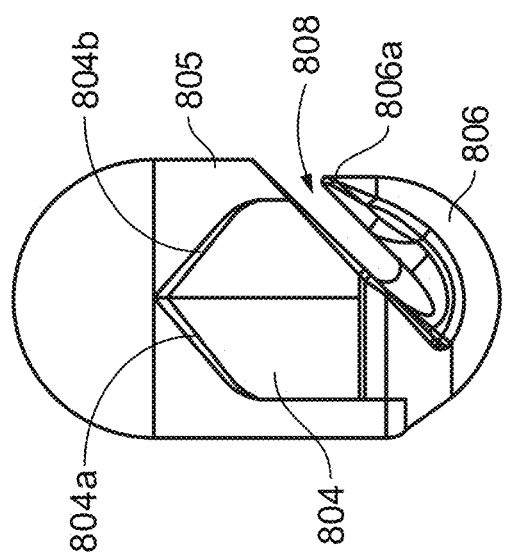
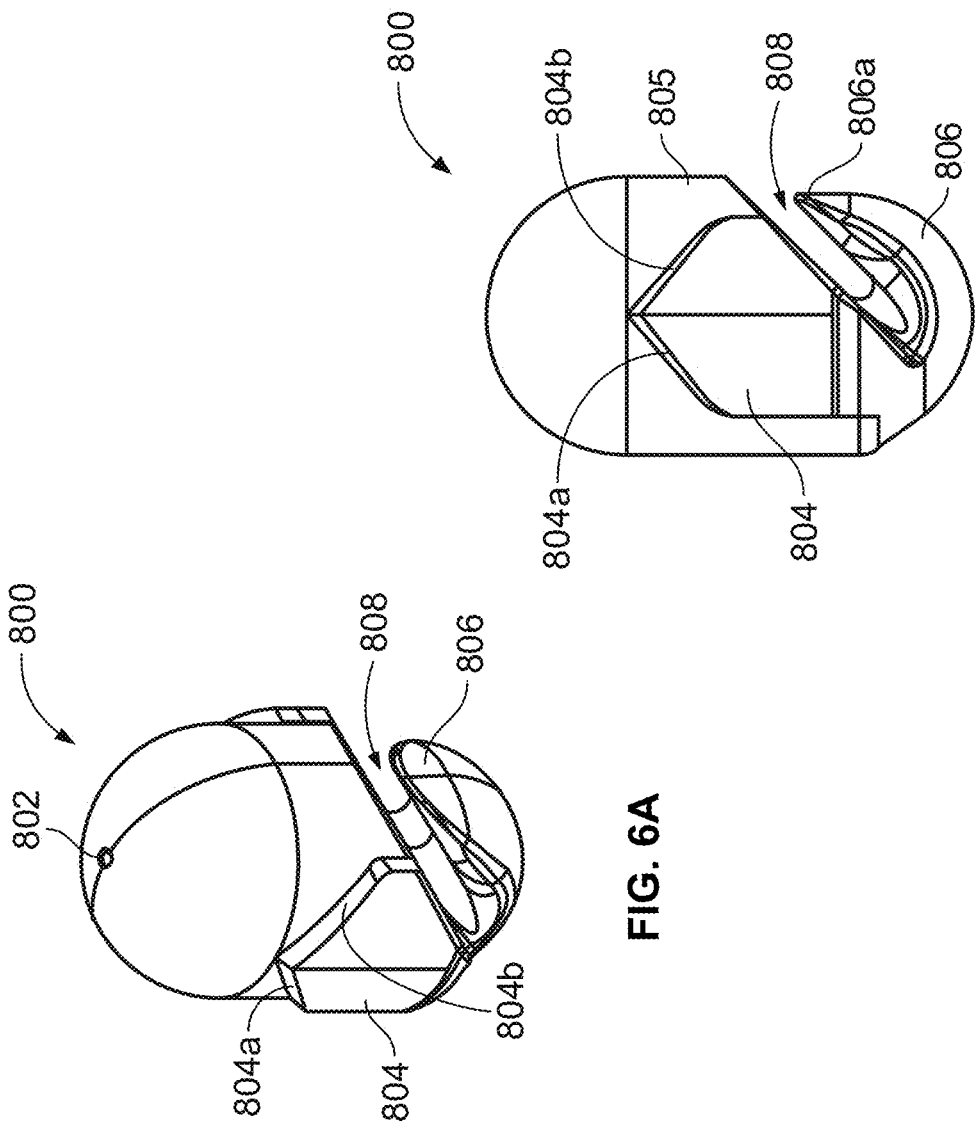
FIG. 6C
FIG. 6B
FIG. 6A

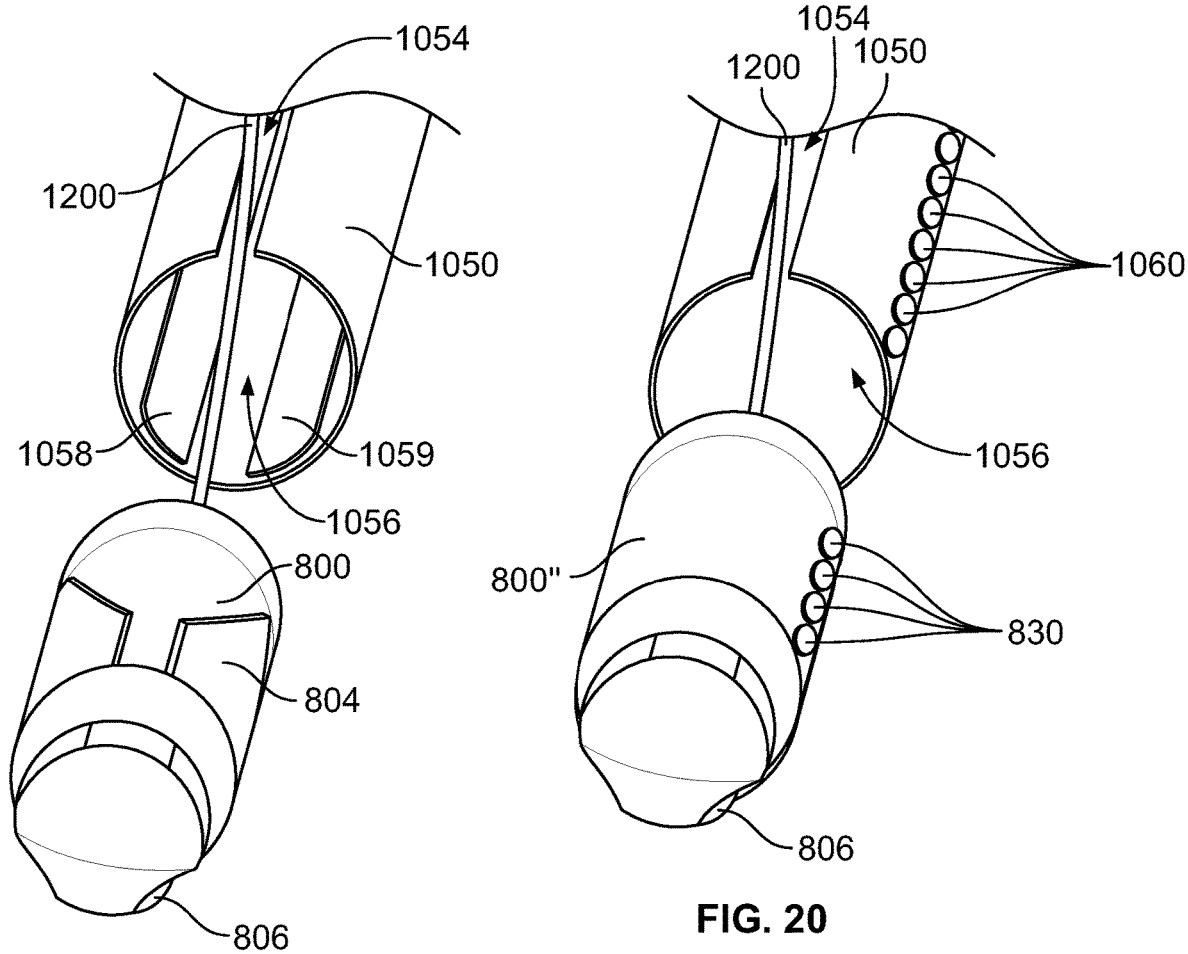
FIG. 19
FIG. 20
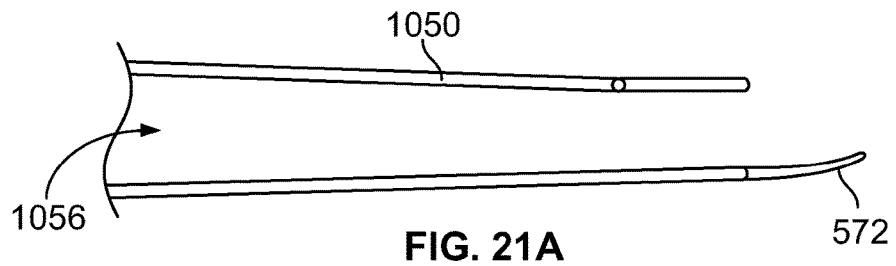
FIG. 21A
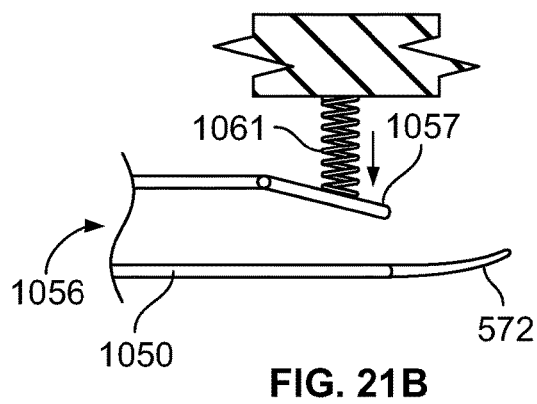
FIG. 21B

PACKAGE LOADING MECHANISM

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to deliver a payload to, or retrieve a payload from, an individual or business. In some operations, once the UAV arrives at a retrieval site, the UAV may land or remain in a hover position. At this point, a person at the retrieval site may secure the payload to the UAV at an end of a tether attached to a winch mechanism positioned with the UAV, or to the UAV itself. For example, the payload may have a handle that may be secured to a device at the end of the winch, or a handle that may be secured within the UAV. However, this scenario has a number of drawbacks. In particular, if the UAV is late for arrival at the retrieval site, the person designated for securing the payload to be retrieved by the UAV may have to wait a period of time before the UAV arrives, resulting in undesirable waiting time. Similarly, if the UAV arrives and the person designated to secure the payload to be retrieved to the UAV is delayed or fails to show up, the UAV may have to wait in a hover mode or on the ground until the designated person arrives to secure the payload to the UAV, resulting in undesirable delay and expenditure of energy by the UAV as the UAV waits for the designated person to arrive, and also resulting in undesirable delay in the subsequent delivery of the payload at a delivery site.

As a result, it would be desirable to provide for the automated pickup of a payload by the UAV, where the UAV may automatically pick up the payload without the need for a designated person to secure the payload to the UAV at the retrieval site. Such automated pickup of the payload by the UAV would advantageously eliminate the need for a designated person to secure the payload to the UAV and eliminate potential delays associated with the late arrival of the UAV or designated person at the retrieval site.

SUMMARY

The present embodiments provide a payload retrieval apparatus and method useful for automatic pickup of a payload at a payload retrieval site by a UAV having a payload retriever suspended from a tether attached to the UAV. The payload retrieval apparatus may be a non-permanent structure that includes an extending member that may be secured to a base or stand at a lower end of the extending member, and an angled extender may be attached at an upper end of the extending member. A channel may be attached to the angled extender, with a first end of the channel having one or more tether engagers extending therefrom. A payload holder secures a payload to a second end of the channel.

In operation, a UAV arrives at the payload retrieval site with a tether extending downwardly from the UAV and with the payload retriever suspended from the end of the tether. The UAV approaches the payload retrieval apparatus, and as it nears the payload retrieval apparatus, the tether comes into contact with a tether engager, and as the UAV moves forward, the tether slides inwardly along the tether engager where it is directed towards the first end of the channel. With further forward or upward movement of the UAV, or upward winching of the payload retriever, the tether moves into and through a tether slot in the channel and the payload retriever attached to the tether is pulled into the channel by the tether. The payload retriever is pulled through the channel where it engages, and secures, the payload positioned on a payload holder. The payload retriever then pulls the payload free from the payload holder. Once the payload is free from the payload holder, the payload may be winched upwardly into secure engagement with the UAV, and the UAV may continue on to a delivery site where the payload may be delivered by the UAV. In this manner, automatic pick up of a payload by a UAV is achieved without the need for a person to participate in the retrieval of the payload from a retrieval site.

In one aspect, a payload retrieval apparatus is provided including an extending member having an upper end and a lower end, a channel having a first end and a second end, the channel coupled to the extending member, a first extension that extends in a first direction from the first end of the channel, wherein the first extension is configured to direct a tether extending from a UAV and a payload retriever attached to an end of the tether_toward the first end of the channel, wherein the second end of the channel has a payload engaging member positioned near the second end of the channel that is adapted to secure a payload, and wherein the payload retrieval apparatus is configured to cause the UAV to pick up the payload with the payload retriever while maintaining flying.

In another aspect, system for payload retrieval is provided including a payload retrieval apparatus having a channel having a first end and a second end, a first extension that extends in a first direction from the first end of the channel, wherein the first extension is configured to direct a tether extending from a UAV and a payload retriever attached to an end of the tether towards the first end of the channel, wherein the second end of the channel has a payload engaging member adapted to secure a payload, wherein the system is configured to cause the UAV to pick up the payload with the payload retriever while maintaining flying, and wherein the channel includes a tether slot that extends from the first end of the channel to the second end of the channel, the tether slot configured to guide passage of the tether coupled to the payload retriever when the payload retriever is passing within the channel.

In yet another aspect, a method of retrieving a payload is provided, including (i) positioning a payload having a handle with an aperture on a payload engaging member coupled to a channel on a payload retrieval apparatus; (ii)

causing a UAV having a payload retriever attached to a tether suspended from the UAV to position the tether to come into contact with a first extension extending from an end of the channel; (iii) causing the UAV to advance the tether into a tether slot positioned on a top of the channel, wherein the tether slot has a width that is narrower than a width of the payload retriever; (iv) causing the UAV to advance the payload retriever into the channel; (v) causing the UAV to advance the payload retriever until the payload retriever engages the handle of the payload; and (vi) causing the UAV to pick up the payload by the payload retriever thereby disengaging the payload from the payload engaging member.

The present embodiments further provide means for automatically retrieving a payload from a payload retrieval apparatus with a UAV having a payload retriever attached to a tether that is suspended from the UAV.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a simplified block diagram illustrating a UAV system, according to an example embodiment.

FIGS. 4A, 4B, and 4C show a payload delivery apparatus, according to example embodiments.

FIG. 6A is a perspective view of payload coupling apparatus 800, according to an example embodiment.

FIG. 6B is a side view of payload coupling apparatus 800 shown in FIG. 6A.

FIG. 6C is a front view of payload coupling apparatus 800 shown in FIGS. 6A and 6B.

FIG. 19 is a perspective view of channel 1050 of the payload retrieval apparatus 1000 shown in FIGS. 14-16 with a payload retriever 800 positioned therein.

FIG. 20 is a perspective view of channel 1050 of the payload retrieval apparatus 1000 shown in FIGS. 14-16 with a payload retriever 800" positioned therein.

FIG. 21A is a cross-sectional view of channel 1050, according to an example embodiment.

FIG. 21B is a side view of channel 1050 having a spring 1059 biased against end 1057 thereof.

DETAILED DESCRIPTION

Figure 1A:
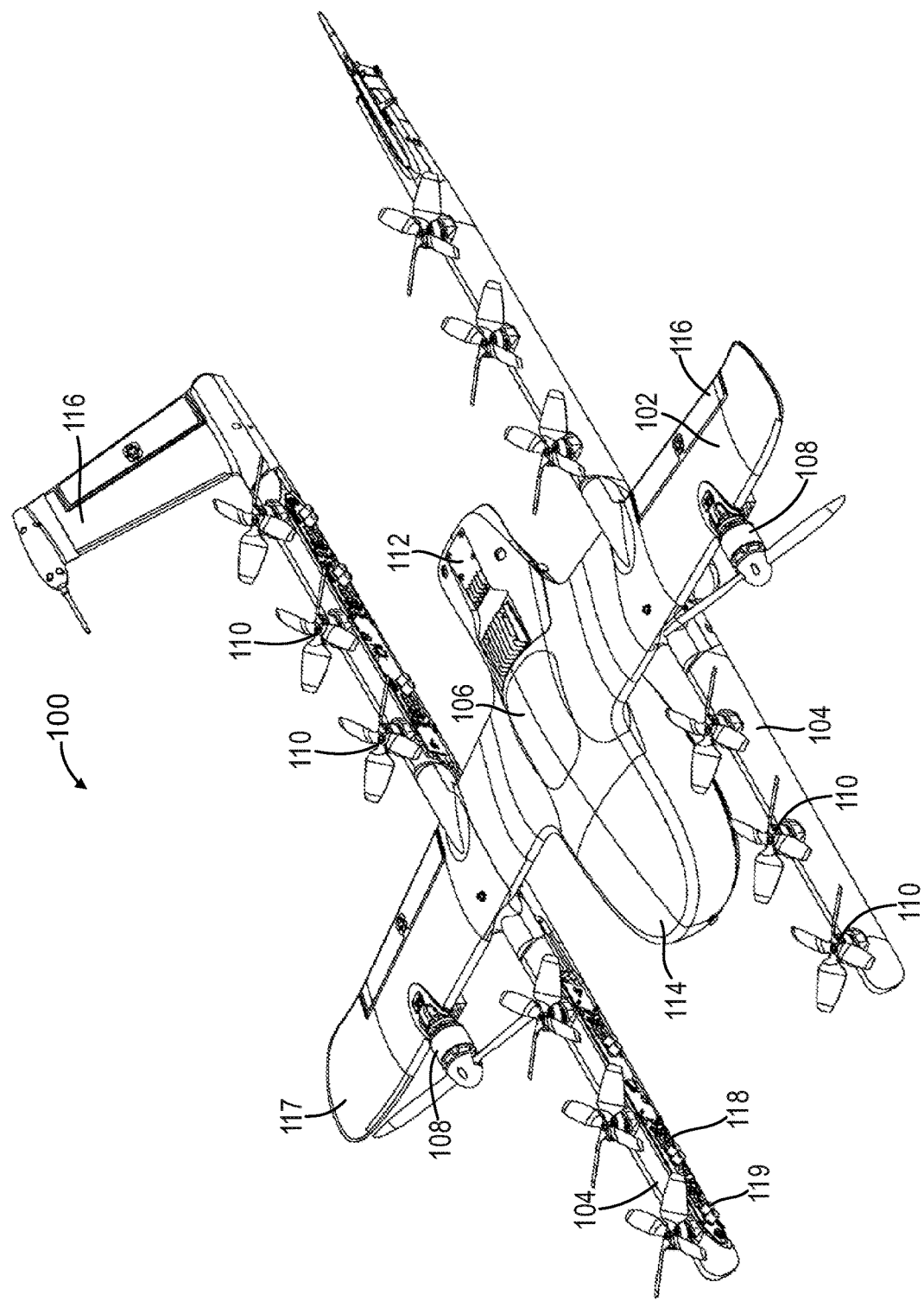
FIG. 1A is an isometric view of an example unmanned aerial vehicle 100, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The present embodiments advantageously provide a payload retrieval apparatus used for the automatic pickup of a payload at a payload retrieval site. With the disclosed payload retrieval apparatus, a UAV may automatically pick up the payload without the need for a designated person to secure the payload to the UAV at the retrieval site. Such automated pickup of the payload by the UAV advantageously eliminates the need for a designated person to secure the payload to the UAV and eliminates potential delays associated with the late arrival of the UAV or designated person at the retrieval site.

The payload retrieval apparatus may be a non-permanent structure placed at a payload retrieval site. The apparatus includes an extending member that may be secured to a base or stand at a lower end of the extending member. An angled extender may be attached at an upper end of the extending member. The angled extender may have an upper end secured to a channel. A first end of the channel may have a first extension or tether engager that extends in a first direction from a lower end of the channel and a second extension or tether engager that extends in a second direction from the lower end of the channel. A second end of the channel may have a payload holder positioned near or thereon that is adapted to secure a payload to the second end of the channel.

The payload retrieval apparatus may be used to provide for automatic pickup of the payload by a UAV. In operation, a payload is positioned on the payload holder on the second end of the channel at the payload retrieval site. A UAV arrives at the payload retrieval site with a tether extending downwardly from the UAV and with a payload retriever positioned on the end of the tether. The UAV approaches the payload retrieval apparatus, and as it nears the payload retrieval apparatus, the tether comes into contact with the first or second extension (tether engager). As the UAV moves forward, the tether slides inwardly along the first or second extension where it is directed towards the first end of the channel. With further forward movement of the UAV, the tether moves through a tether slot in the channel and eventually the payload retriever attached to the tether is pulled into the channel by the tether. The payload retriever is pulled through the channel where it engages, and secures, the payload secured to the payload holder. The payload retriever then pulls the payload free from the payload holder. Once the payload is free from the payload holder, the payload may be winched upwardly into secure engagement with the UAV, and the UAV may continue on to a delivery site where the payload may be delivered by the UAV. As illustrated above, the payload may be a package having an upwardly extending handle with an aperture positioned within the handle. The handle may include a pair of openings through which pins positioned on the second end of the channel may be placed through to secure the payload to the payload retrieval payload retrieval apparatus prior to retrieval. In this manner, the payload is in a suspended position beneath the pins which secure the payload to the payload retrieval apparatus by the pins that extend through the openings in the handle of the payload, and the payload is ready to be retrieved. The payload retriever positioned on the end of the tether extending beneath the UAV may have a hook or other member that extends through the aperture in the handle as it moves through the second end of the channel to disengage the pins from the openings in the handle and thereby remove the payload from the payload holder on the channel of the payload retrieval apparatus. In other embodiments, rather than using pins that extend through openings in the handle, a magnet(s) could be placed on the handle that cooperates with a magnet(s), or a metal, on the channel that serves as the payload holder. Other ways of securing the payload to the payload retrieval apparatus are also contemplated.

The payload retriever may take the form of a capsule attached to an end of the tether, where the capsule has a slot with a hook or lip formed beneath the slot. The hook or lip is adapted to extend through the aperture in the handle of the payload during payload retrieval. The area above the aperture in the handle extends within the slot of the capsule and the payload is suspended beneath the handle by the hook or lip after retrieval. The capsule may also be provided with a movable hook or lip that may be extended outwardly from the capsule at the time of payload retrieval, and later retracted to prevent the hook from reengaging with the handle of the package after disengagement with the handle of the payload at the time of payload delivery, or engaging branches or wires following disengagement from the payload at the time of payload delivery.

During retrieval of the payload, the tether initially engages the first or second extension (tether engager) and is drawn towards the channel as the UAV moves forward. A shield may be positioned beneath the first end of the channel to prevent the tether or capsule from engaging the extending member or angled extender and becoming tangled therewith prior to entry of the capsule into the channel. The first and second extensions may also have extending shields, such as fabric layers that prevent the capsule and/or tether from wrapping around the first or second extensions as the tether engages the first or second extension. The channel includes a tether slot on its upper surface through which the tether passes as the capsule moves towards the payload positioned on the payload holder on the second end of the channel. The tether slot has a width that is less than the width of the capsule so that the capsule remains positioned within the channel as it moves towards the payload on the payload holder.

In order to ensure that the slot and hook of the capsule are in a proper orientation as the capsule exits the channel and engages the handle of the payload, the capsule may be provided with exterior cams or slots that correspond to cams or slots positioned on an interior surface of the channel. The interaction of the cams or slots on the capsule and cams or slots on the interior of the channel properly orient the capsule within the channel such that the hook or lip beneath the slot of the capsule is in proper position to extend through the aperture on the handle of the payload to remove the payload from the payload holder. The channel may also have an interior that tapers downwardly, or decreases in size, as the channel moves from the first end where the capsule enters to the second end where the capsule exits to further facilitate the proper orientation of the capsule within the channel. In addition, the second end of the channel could be spring loaded or operate as a leaf spring, to also facilitate the proper orientation of the capsule at the point of payload retrieval.

Alternately, the capsule may be equipped with one or more magnets that cooperate with one or more magnets, or a metal, positioned on an interior of the channel and magnetic interaction is used to properly orient the capsule within the channel during the process of payload retrieval. In addition, the capsule could be weighted to have an offset center of gravity such that the hook and slot of the capsule are positioned properly (with the "heavy" portion of the capsule on a lower side) to engage the handle of the payload and effect removal of the payload from the payload holder.

In addition, a payload loading apparatus or chute may be positioned adjacent the payload retrieval apparatus to allow for a plurality of payloads to be positioned for retrieval by a UAV. For example, the payload loading apparatus or chute may have a plurality of payloads positioned thereon, such that as soon as a payload is removed from the payload holder, a successive payload moves (or is moved) into position on the payload holder and is ready for retrieval by the next UAV that arrives at the payload retrieval site.

Not only does the payload retrieval apparatus disclosed herein provide for automatic payload retrieval without the need for human involvement, but the UAV advantageously is not required to land for the payload to be loaded onto the UAV at the payload retrieval site. Thus, the UAV may simply fly into position near the payload retrieval apparatus and maneuver itself to position the tether between the first and second extensions and then move forward to pull the capsule through the channel and into engagement with the handle of the payload and effect removal of the payload. In some payload retrieval sites, landing the UAV may be difficult or impractical, and also may engage with objects or personnel when landing. Accordingly, allowing for payload retrieval without requiring the UAV to land provides significant advantages over conventional payload retrieval methods.

Furthermore, the payload retrieval apparatus is advantageously a movable, non-permanent apparatus that may be easily set up, taken down, and removed, and may be easily moved from one payload retrieval site to another. The extending member may be removably positioned within a hole in the ground at the payload retrieval site, or may be positioned on a base. The payload retrieval apparatus preferably folds up, like an umbrella stand, to facilitate storage and transport of the payload retrieval apparatus. The non-permanent nature of the payload retrieval apparatus also may eliminate the need for a permit for the payload retrieval apparatus at the retrieval site.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
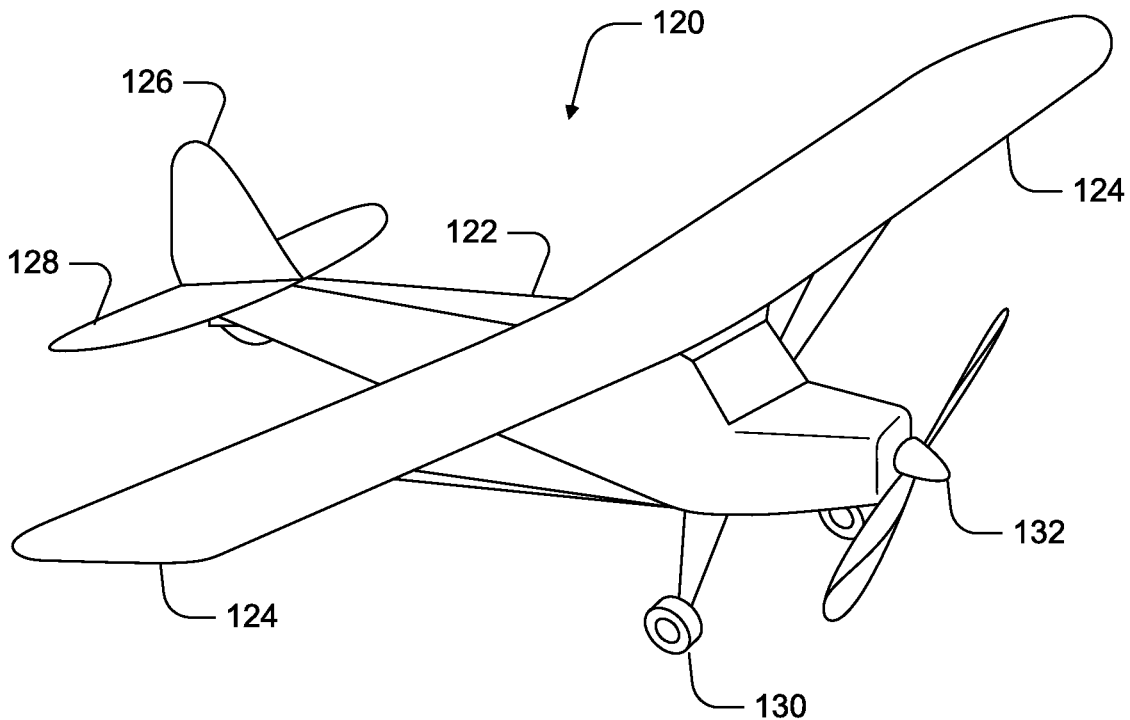
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
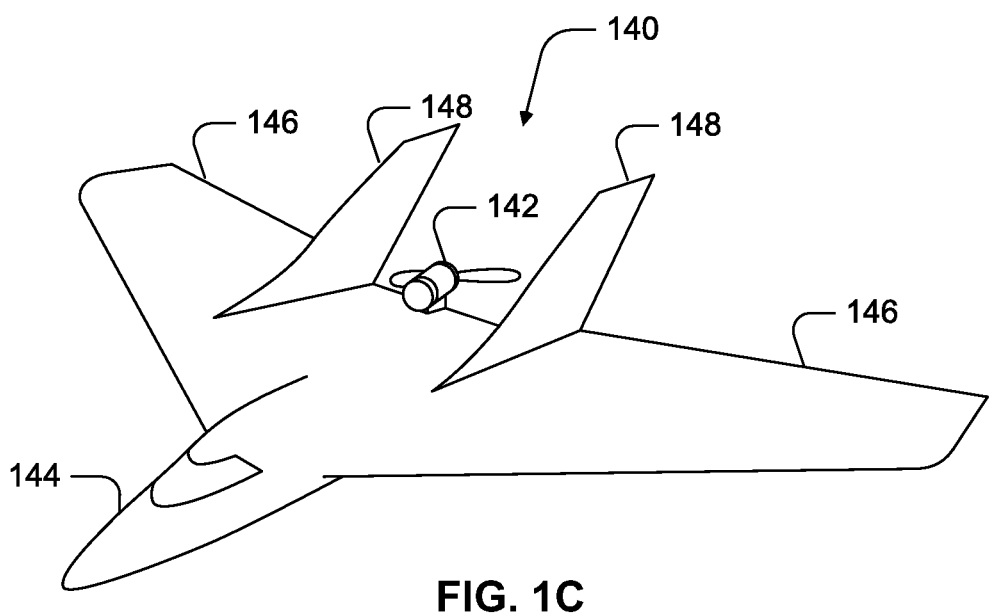
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
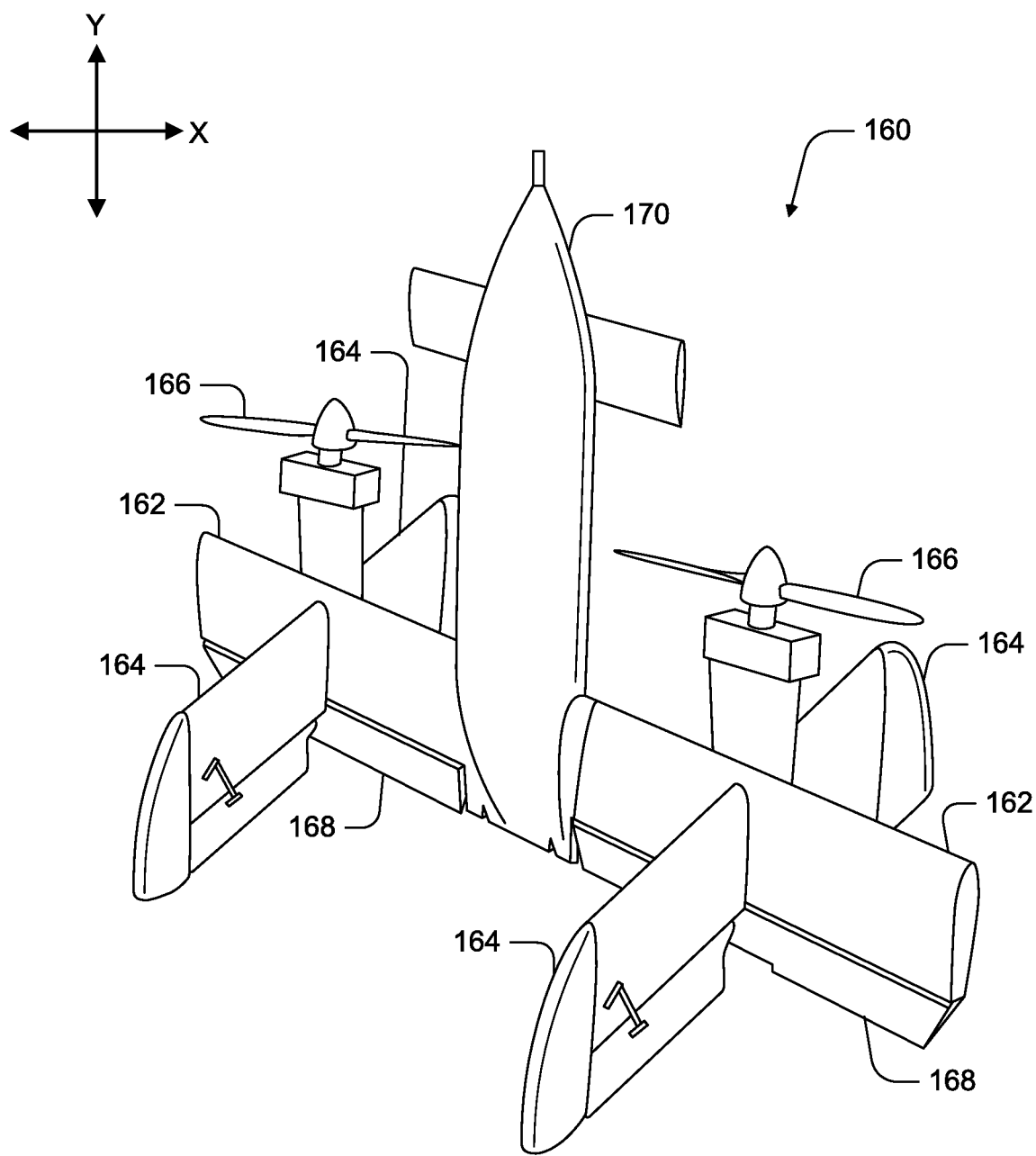
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
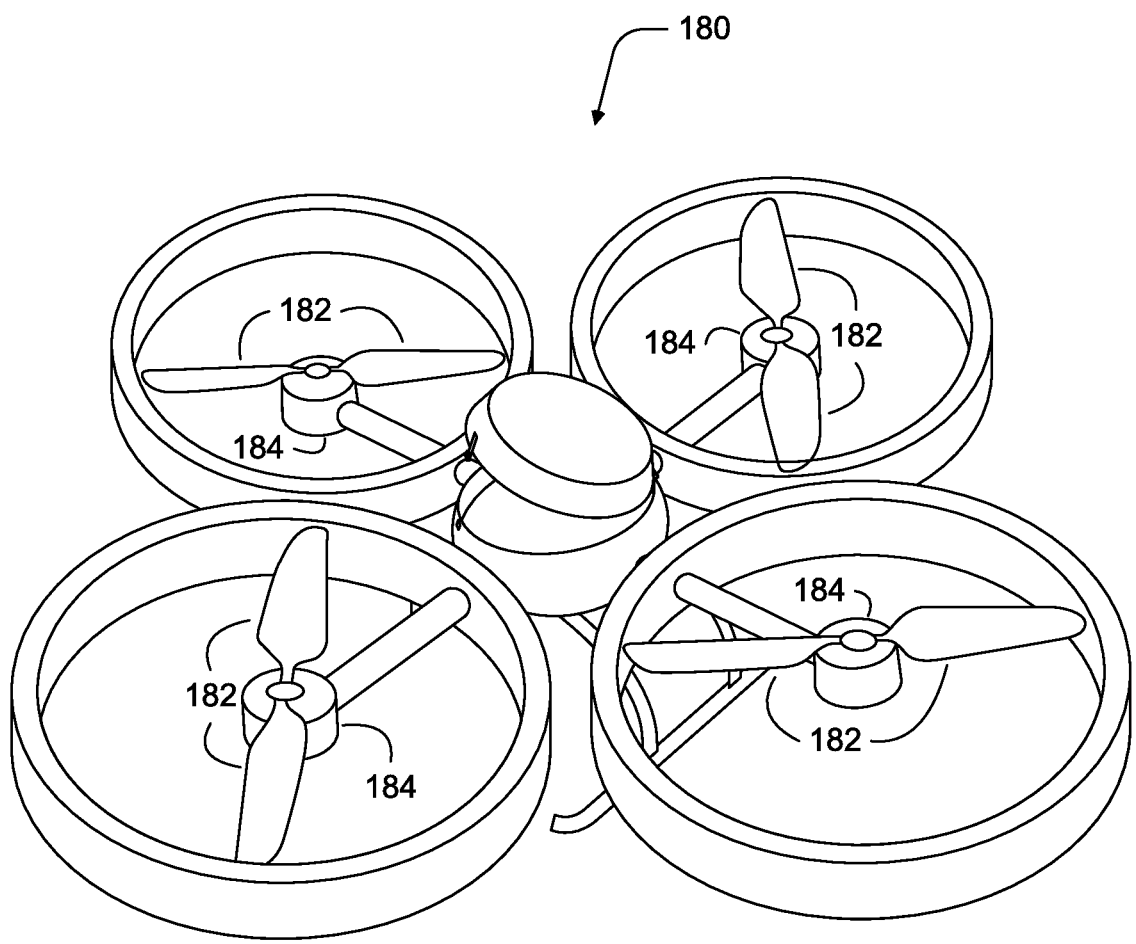
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting.

Example embodiments may relate to, be implemented within, or take the form of any type of unmanned aerial vehicle.

III. ILLUSTRATIVE UAV COMPONENTS

Figure 2:
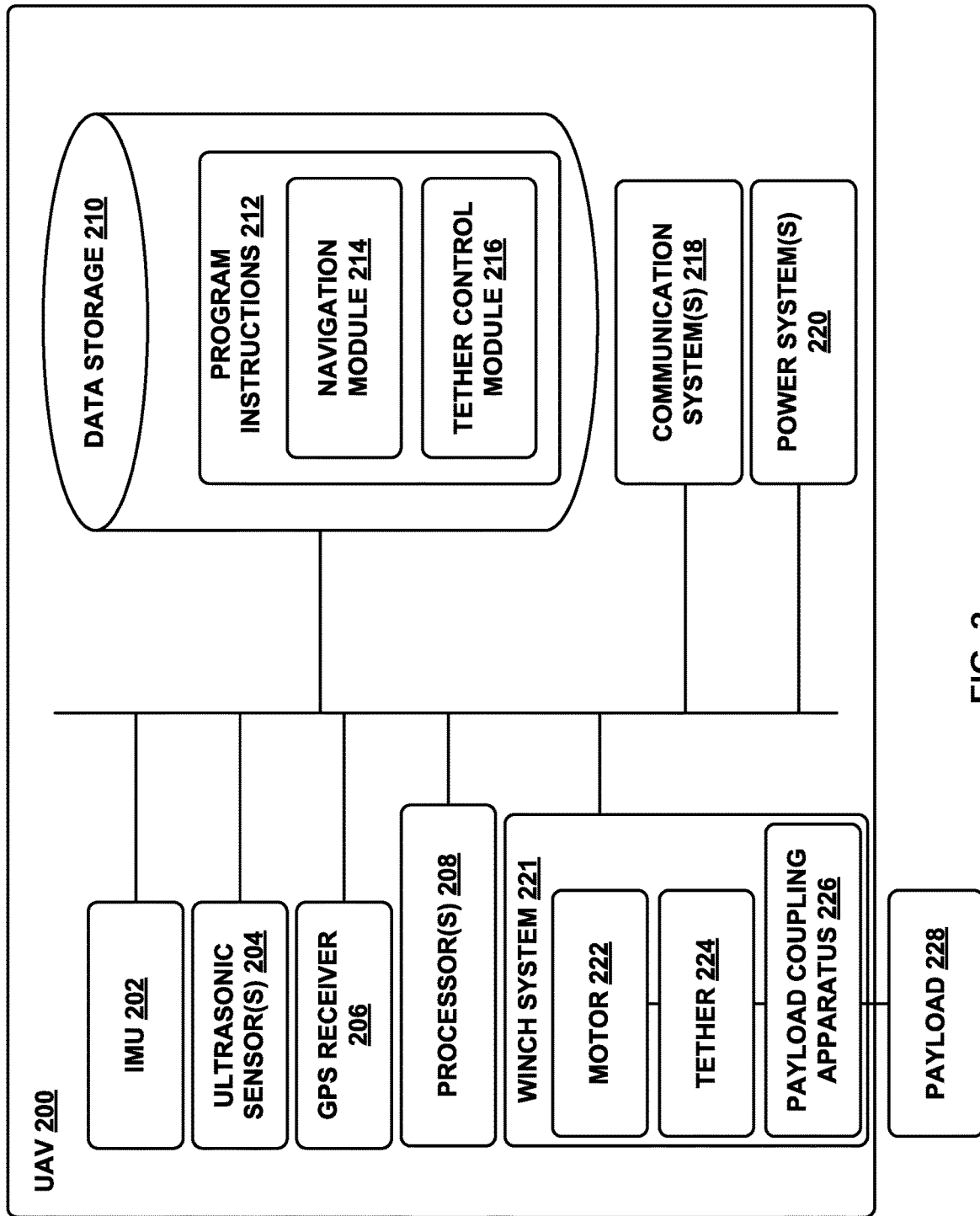
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LA-DAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE SYSTEM AND APPARATUS FOR PAYLOAD DELIVERY

FIGS. 4A, 4B, and 4C show a UAV 400 that includes a payload delivery system 410 (could also be referred to as a payload delivery apparatus), according to an example embodiment. As shown, payload delivery system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some embodiments, the payload latch 406 may be arranged to engage the spool 404 or the payload 408 rather than the payload coupling apparatus 412 in order to prevent the payload 408 from lowering. In other embodiments, the UAV 400 may not include the payload latch 406, and the payload delivery apparatus may be coupled directly to the UAV 400.

In some embodiments, the spool 404 can function to unwind the tether 402 such that the payload 408 can be lowered to the ground with the tether 402 and the payload coupling apparatus 412 from UAV 400. The payload 408 may itself be an item for delivery, and may be housed within (or otherwise incorporate) a parcel, container, or other structure that is configured to interface with the payload latch 406. In practice, the payload delivery system 410 of UAV 400 may function to autonomously lower payload 408 to the ground in a controlled manner to facilitate delivery of the payload 408 on the ground while the UAV 400 hovers above.

As shown in FIG. 4A, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some embodiments, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some embodiments, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other embodiments, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some embodiments, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
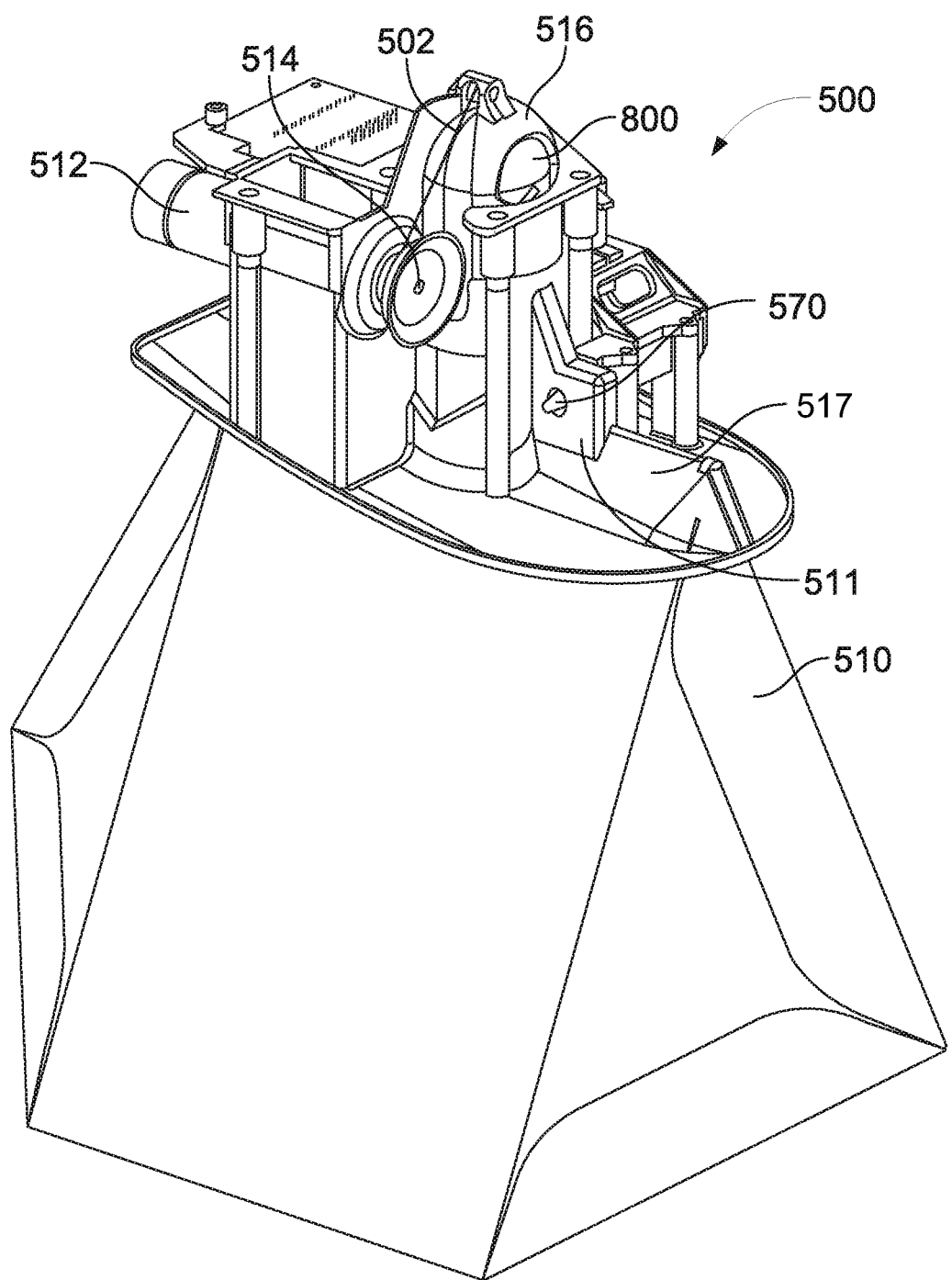
FIG. 5A shows a perspective view of a payload delivery apparatus 500 including payload 510, according to an example embodiment.

FIG. 5A shows a perspective view of a payload delivery apparatus 500 including payload 510, according to an example embodiment. The payload delivery apparatus 500 is positioned within a fuselage of a UAV (not shown) and includes a winch 514 powered by motor 512, and a tether 502 spooled onto winch 514. The tether 502 is attached to a payload coupling apparatus or payload retriever 800 positioned within a payload coupling apparatus receptacle 516 positioned within the fuselage of the UAV (not shown). A payload 510 is secured to the payload coupling apparatus 800. In this embodiment a top portion 517 of payload 510 is secured within the fuselage of the UAV. A locking pin 570 is shown extending through handle 511 attached to payload 510 to positively secure the payload beneath the UAV during high speed flight.

Figure 5B:
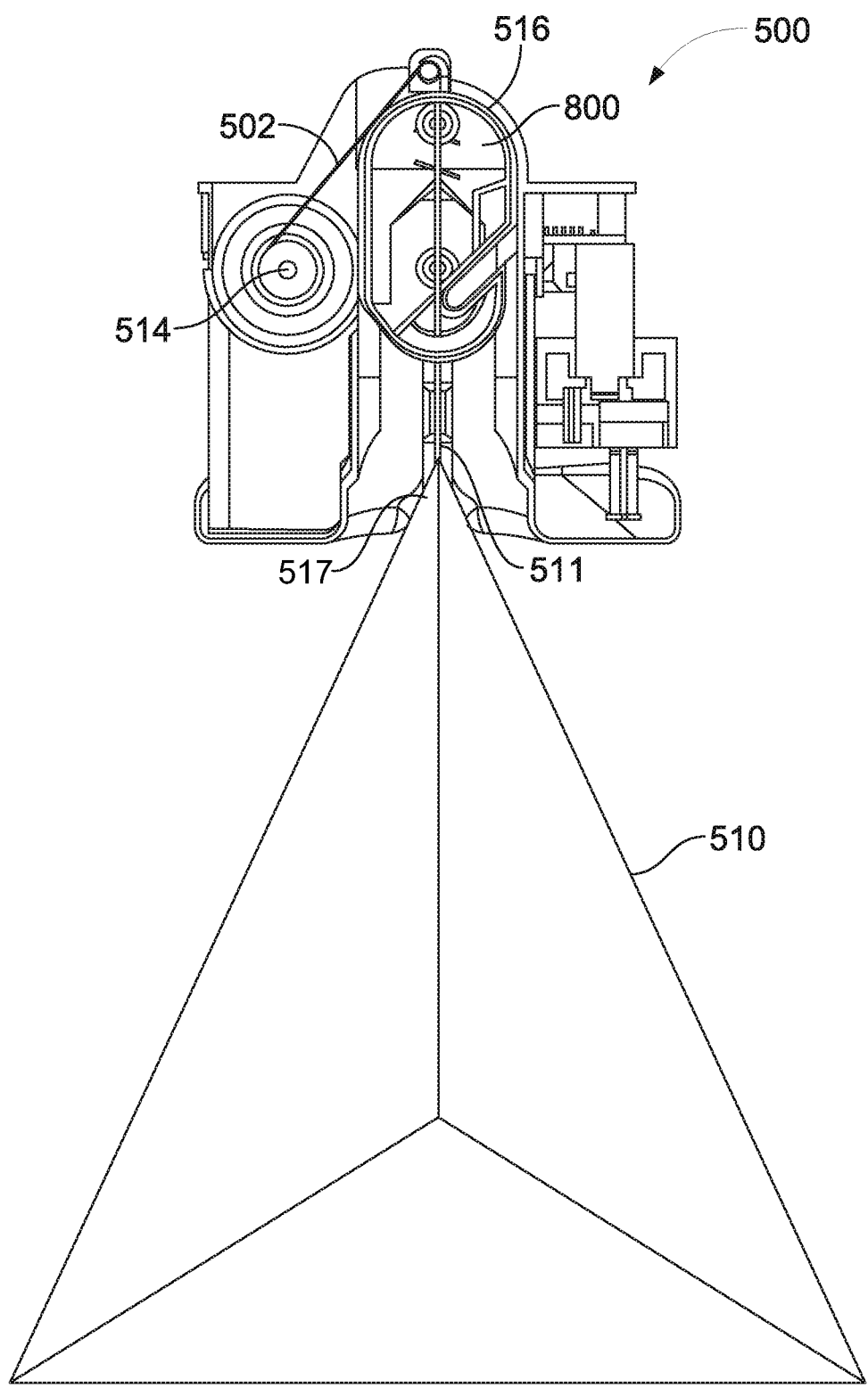
FIG. 5B is a cross-sectional side view of payload delivery apparatus 500 and payload 510 shown in FIG. 5A.

FIG. 5B is a cross-sectional side view of payload delivery apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 800. Top portion 517 of payload 510 is shown positioned within the fuselage of the UAV (not shown) along with handle 511.

Figure 5C:
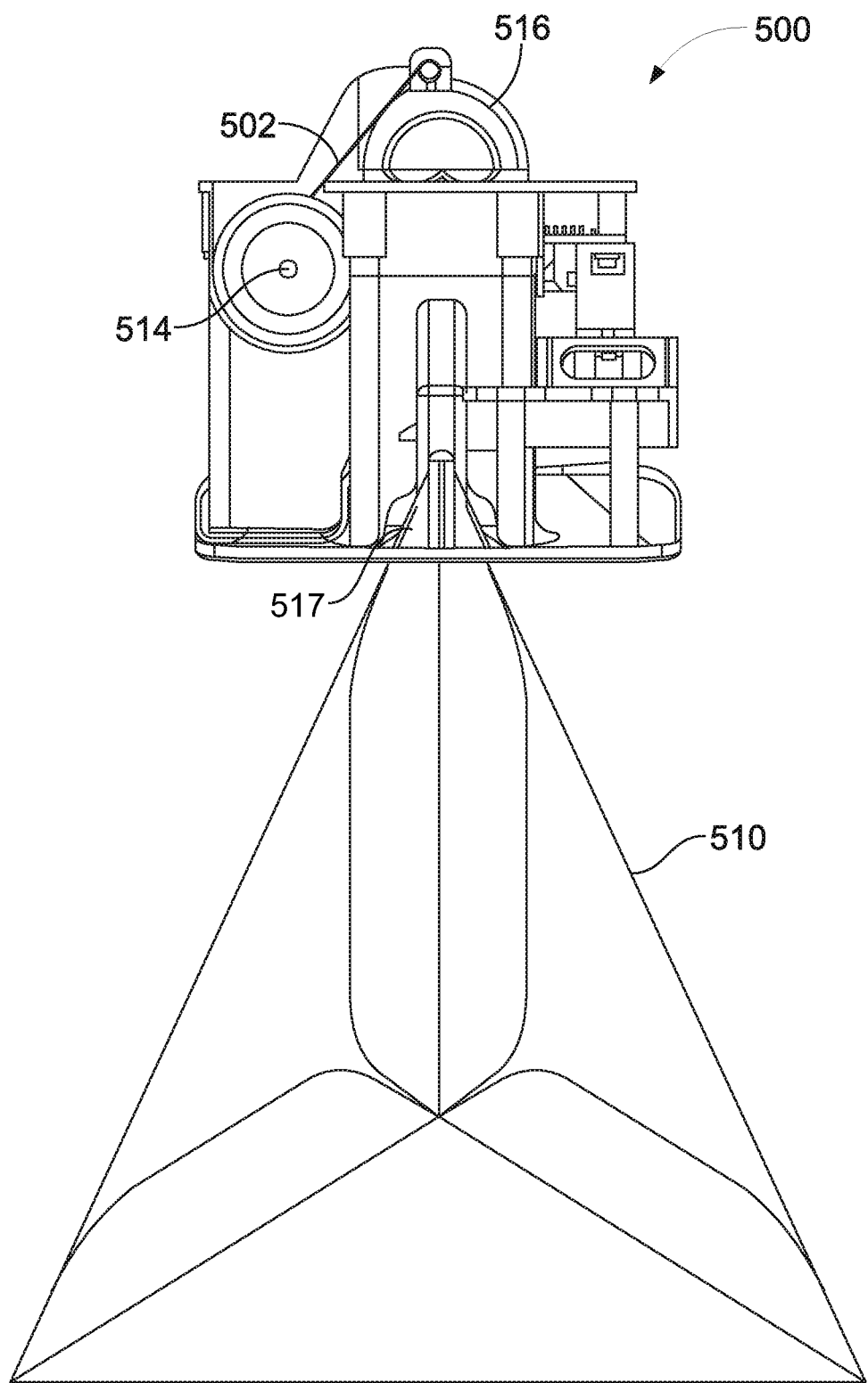
FIG. 5C is a side view of payload delivery apparatus 500 and payload 510 shown in FIGS. 5A and 5B.

FIG. 5C is a side view of payload delivery apparatus 500 and payload 510 shown in FIGS. 5A and 5B. The top portion 517 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape.

VI. EXAMPLE PAYLOAD RETRIEVAL APPARATUS AND PAYLOAD RETRIEVERS

FIG. 6A is a perspective view of payload coupling apparatus 800, according to an example embodiment. Payload coupling apparatus 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload coupling apparatus receptacle positioned with a fuselage of a UAV.

FIG. 6B is a side view of payload coupling apparatus 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the payload after it has been decoupled, or will not get engaged with power lines or tree branches during retrieval to the UAV.

FIG. 6C is a front view of payload coupling apparatus 800 shown in FIGS. 6A and 6B. Lower lip or hook 806 is shown positioned beneath slot 808 that is adapted for securing a handle of a payload.

Figure 7:
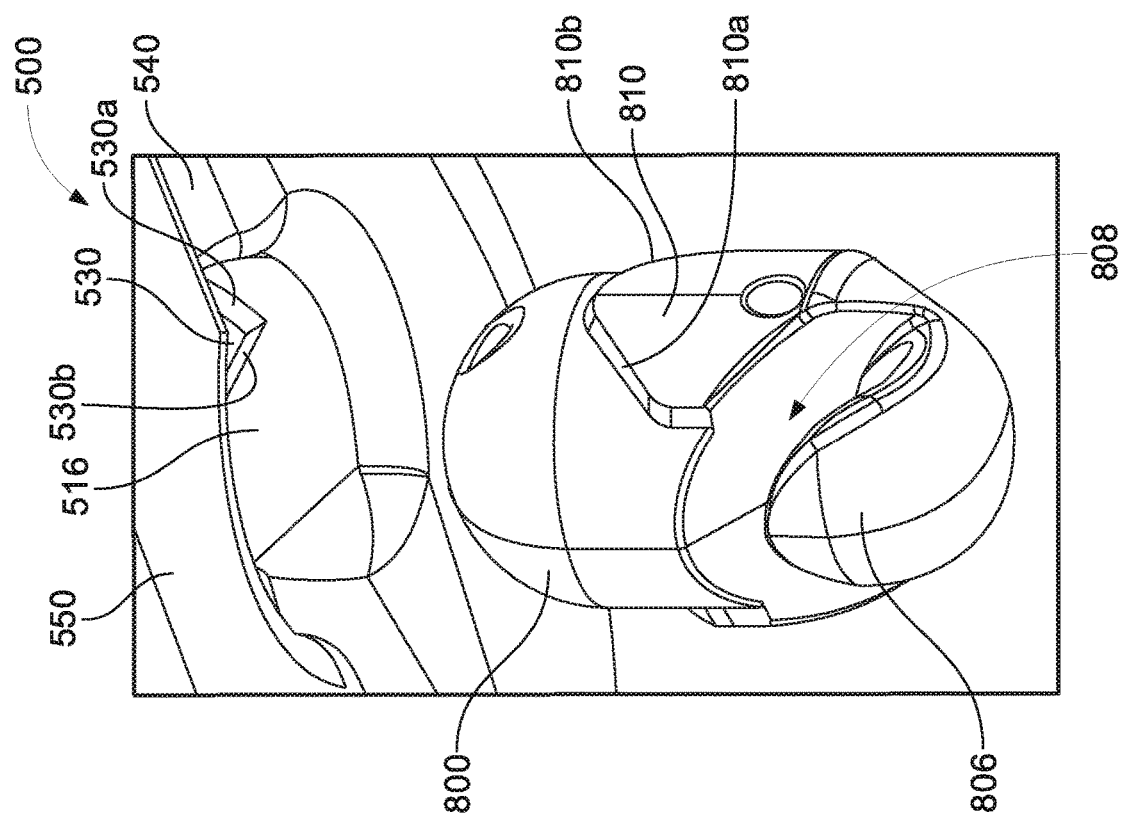
FIG. 7 is a perspective view of payload coupling apparatus 800 shown in FIGS. 6A-6C, prior to insertion into a payload coupling apparatus receptacle positioned in the fuselage of a UAV.

FIG. 7 is a perspective view of payload coupling apparatus 800 shown in FIGS. 6A-6C, prior to insertion into a payload coupling apparatus receptacle 516 positioned in the fuselage 550 of a UAV. As noted previously payload coupling apparatus 800 includes a slot 808 positioned above lower lip or hook 806, adapted to receive a handle of a payload. The fuselage 550 of the payload delivery system 500 includes a payload coupling apparatus receptacle 516 positioned within the fuselage 550 of the UAV. The payload coupling apparatus 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload coupling apparatus receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload coupling apparatus 800 is pulled into to the payload coupling apparatus receptacle 516, the cammed surfaces 810a and 810b of outer protrusion 810 engage with the cammed surfaces 530a and 530b within the payload coupling apparatus receptacle 516 and the payload coupling apparatus 800 is rotated into a desired alignment within the fuselage 550 of the UAV.

Figure 8:
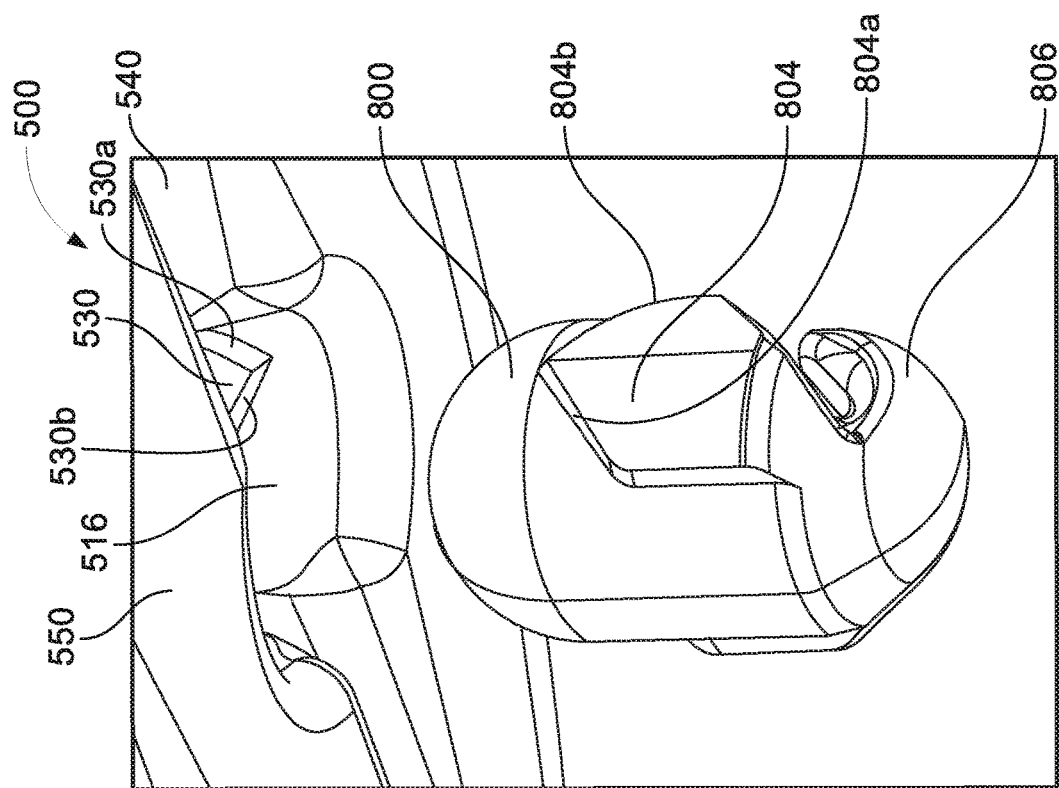
FIG. 8 is another perspective view of payload coupling apparatus 800 shown in FIGS. 6A-6C, prior to insertion into a payload coupling apparatus receptacle positioned in the fuselage of a UAV.

FIG. 8 is another perspective view of an opposite side of payload coupling apparatus 800 shown in FIGS. 6A-6C, prior to insertion into a payload coupling apparatus receptacle 516 positioned in the fuselage 550 of a UAV. As shown, payload coupling apparatus 800 include a lower lip or hook 806. An outer protrusion 804 is shown extending outwardly from the payload coupling apparatus having helical cammed surfaces 804a and 804b adapted to engage and mate with cammed surfaces 530a and 530b of inner protrusion 530 positioned within payload coupling apparatus receptacle 516 positioned within fuselage 550 of payload delivery system 500. It should be noted that the cammed surfaces 804a and 804b meet at a sharp apex, which is asymmetrical with the rounded or blunt apex of cammed surfaces 810a and 810b shown in FIG. 7. In this manner, the rounded or blunt apex of cammed surfaces 810a and 810b prevent possible jamming of the payload coupling apparatus 800 as the cammed surfaces engage the cammed surfaces 530a and 530b positioned within the payload coupling apparatus receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload coupling apparatus receptacle 516 positioned within the fuselage 550 of payload delivery system 500, thereby initiating rotation of the payload coupling apparatus 800 slightly before the rounded or blunt apex of cammed surfaces 810a and 810b engage the corresponding cammed surfaces within the payload coupling apparatus receptacle 516. In this manner, the case where both apexes (or tips) of the cammed surfaces on the payload coupling apparatus end up on the same side of the receiving cams within the payload coupling apparatus receptacle is prevented. This scenario results in a prevention of the jamming of the payload coupling apparatus within the receptacle.

Figure 9:
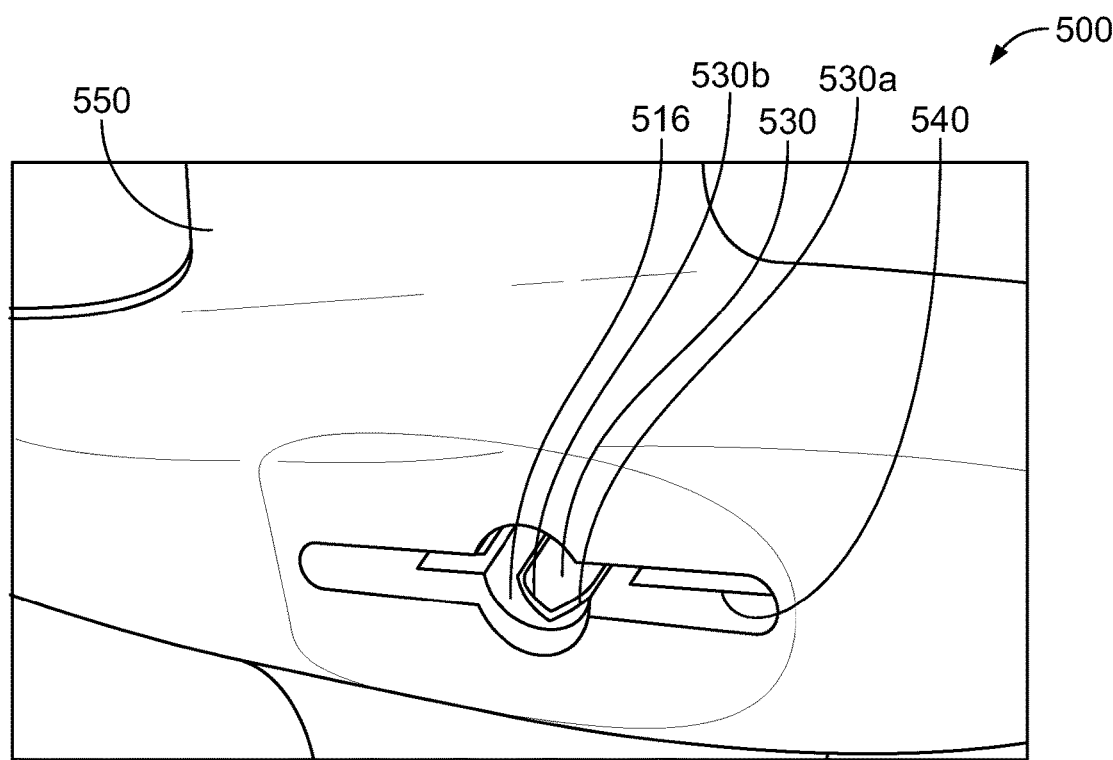
FIG. 9 shows a perspective view of a recessed restraint slot and payload coupling apparatus receptacle positioned in a fuselage of a UAV.

FIG. 9 shows a perspective view of a recessed restraint slot and payload coupling apparatus receptacle positioned in a fuselage of a UAV. In particular, payload delivery system 500 includes a fuselage 550 having a payload coupling apparatus receptacle 516 therein that includes inward protrusion 530 having cammed surfaces 530a and 530b that are adapted to mate with corresponding cammed surfaces on a payload coupling apparatus (not shown). Also included is a longitudinally extending recessed restrained slot 540 into which a top portion of a payload is adapted to be positioned and secured within the fuselage 550.

Figure 10A:
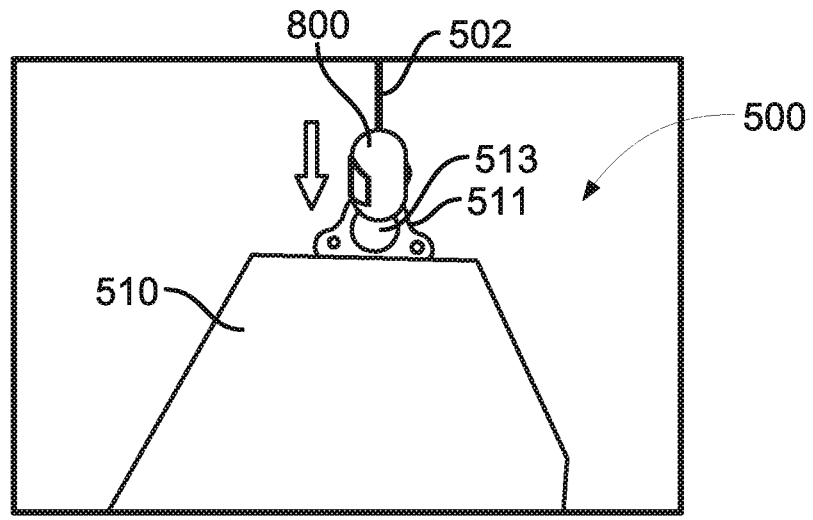
FIG. 10A shows a side view of a payload delivery apparatus 500 with a handle 511 of payload 510 secured within a payload coupling apparatus 800 as the payload 510 moves downwardly prior to touching down for delivery.

FIG. 10A shows a side view of a payload delivery apparatus 500 with a handle 511 of payload 510 secured within a payload coupling apparatus 800 as the payload 510 moves downwardly prior to touching down for delivery. Prior to payload touchdown, the handle 511 of payload 510 includes a hole 513 through which a lower lip or hook of payload coupling apparatus 800 extends. The handle sits within a slot of the payload coupling apparatus 800 that is suspended from tether 502 of payload delivery system 500 during descent of the payload 510 to a landing site.

Figure 10B:
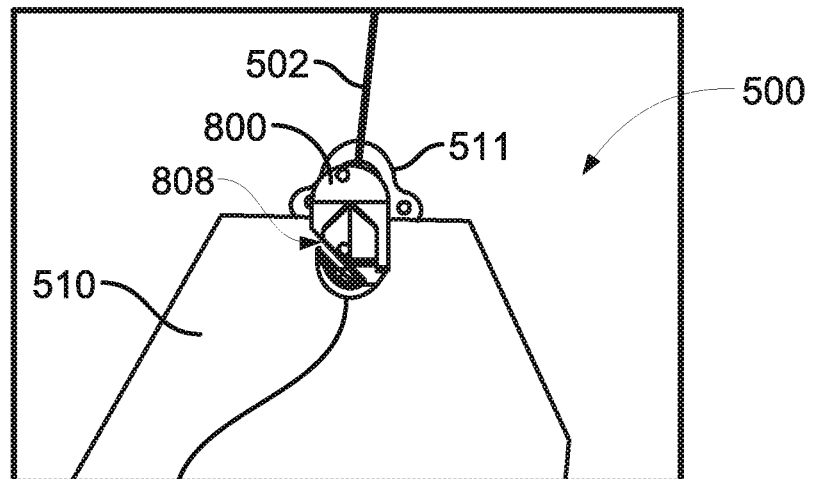
FIG. 10B shows a side view of payload delivery apparatus 500 after payload 510 has landed on the ground showing payload coupling apparatus 800 decoupled from handle 511 of payload 510.

FIG. 10B shows a side view of payload delivery apparatus 500 after payload 510 has landed on the ground showing payload coupling apparatus 800 decoupled from handle 511 of payload 510. Once the payload 510 touches the ground, the payload coupling apparatus 800 continues to move downwardly (as the winch further unwinds) through inertia or gravity and decouples the lower lip or hook 808 of the payload coupling apparatus 800 from handle 511 of payload 510. The payload coupling apparatus 800 remains suspended from tether 502, and can be winched back up to the payload coupling receptacle of the UAV.

Figure 10C:
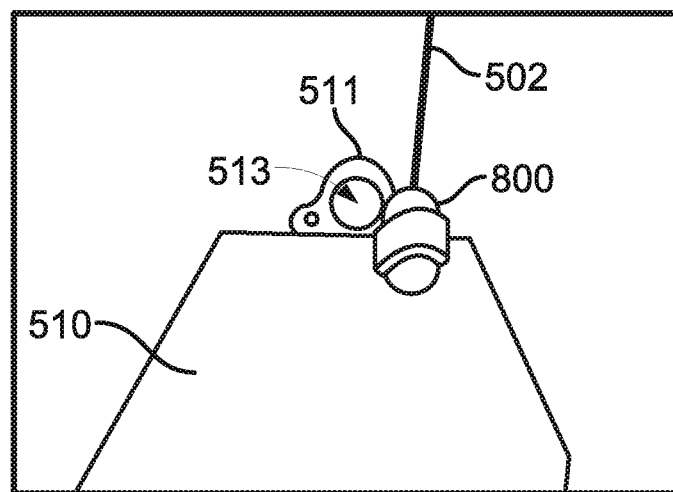
FIG. 10C shows a side view of payload delivery apparatus 500 with payload coupling apparatus 800 moving away from handle 511 of payload 510.

FIG. 10C shows a side view of payload delivery apparatus 500 with payload coupling apparatus 800 moving away from handle 511 of payload 510. Here the payload coupling apparatus 800 is completely separated from the hole 513 of handle 511 of payload 510. Tether 502 may be used to winch the payload coupling apparatus back to the payload coupling apparatus receptacle positioned in the fuselage of the UAV.

Figure 11A:
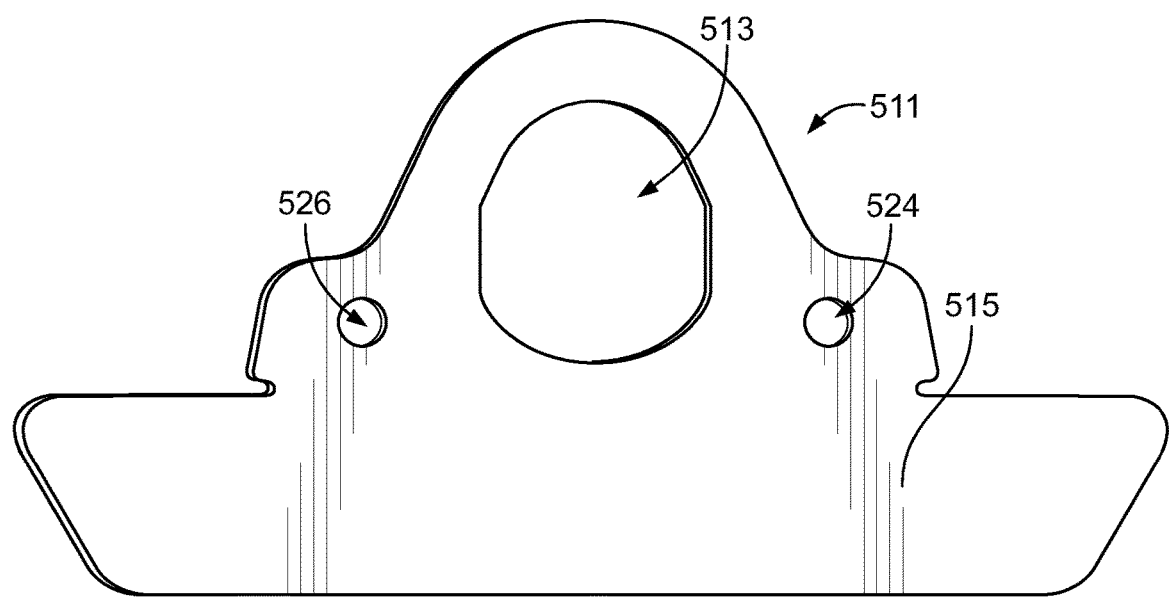
FIG. 11A is a side view of handle 511 of payload 510 having openings 514 and 516 adapted to receive pins positioned on a payload holder, according to an example embodiment.

FIG. 11A is a side view of handle 511 of payload 510. The handle 511 includes an aperture 513 through which the lower lip or hook of a payload coupling apparatus extends through to suspend the payload during delivery, or for retrieval. The handle 511 includes a lower portion 515 that is secured to the top portion of a payload. Also included are holes 524 and 526 through which locking pins positioned within the fuselage of a UAV, may extend to secure the handle and payload in a secure position during high speed forward flight to a delivery location. In addition, holes 524 and 526 are also designed for pins of a payload holder to extend therethrough to hold the payload in position for retrieval on a payload retrieval apparatus. The handle may be comprised of a thin, flexible plastic material that is flexible and provides sufficient strength to suspend the payload beneath a UAV during forward flight to a delivery site, and during delivery and/or retrieval of a payload. In practice, the handle may be bent to position the handle within a slot of a payload coupling apparatus. The handle 511 also has sufficient strength to withstand the torque during rotation of the payload coupling apparatus into the desired orientation within the payload coupling apparatus receptacle, and rotation of the top portion of the payload into position with the recessed restraint slot.

Figure 11B:
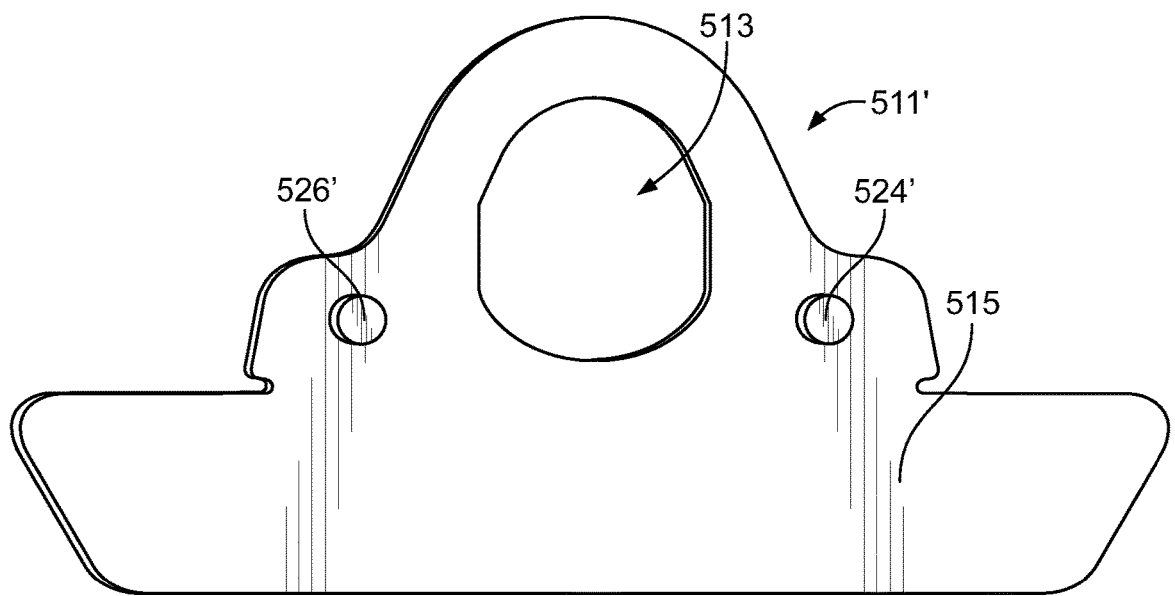
FIG. 11B is a side view of handle 511' of a payload having magnets 514' and 516' positioned thereon for magnetic engagement with a payload holder, according to an example embodiment.

FIG. 11B is a side view of handle 511' of payload 510. The handle 511' includes an aperture 513 through which the lower lip or hook of a payload coupling apparatus extends through to suspend the payload during delivery, or for retrieval. The handle 511' includes a lower portion 515 that is secured to the top portion of a payload. Also included are magnets 524' and 526' adapted for magnetic engagement with corresponding magnets (or a metal) of a payload holder to secure the payload to the payload holder in position for retrieval on a payload retrieval apparatus. In some examples, magnets 524' and 526' are provided on a handle (e.g., handle 511 or 511') in place of holes 524 and 526. In other examples, magnets 524' and 526' are provided in addition to holes 524 and 526.

Figure 12:
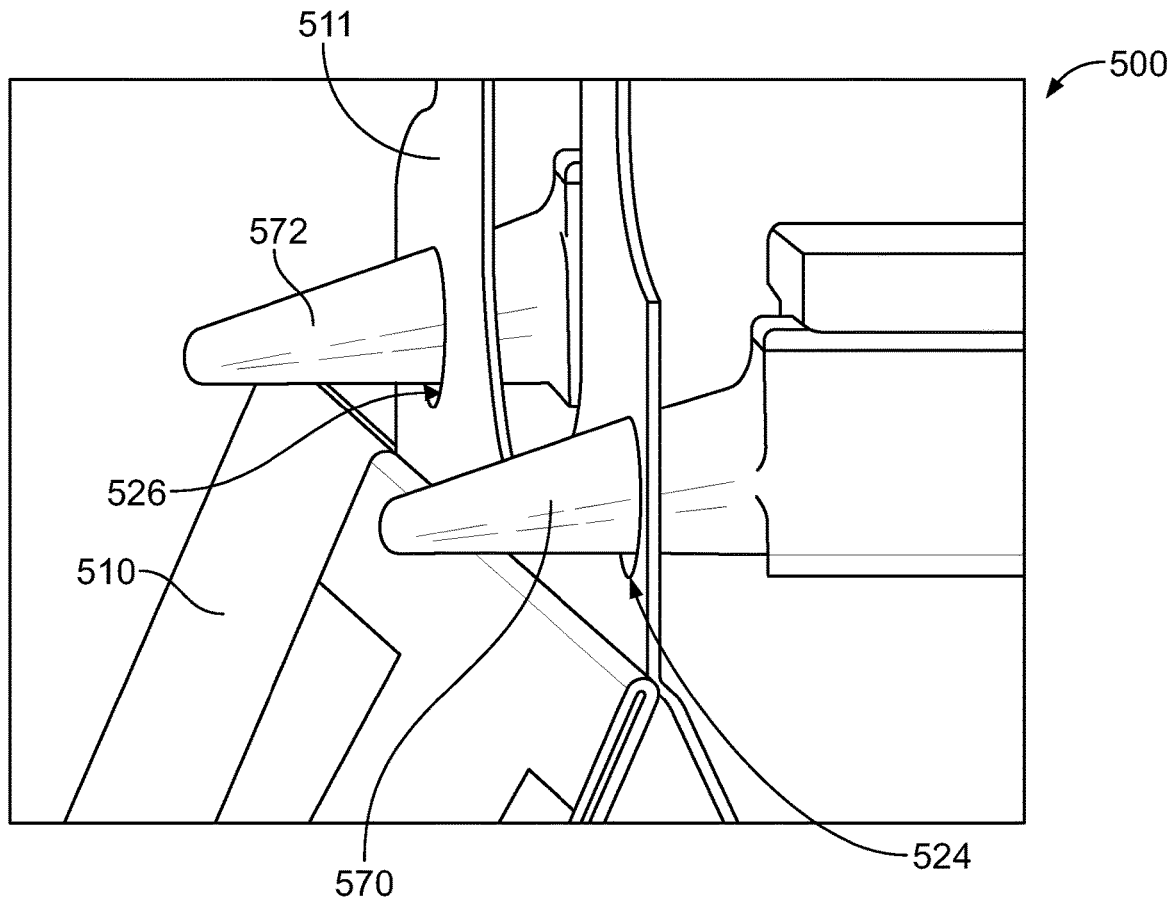
FIG. 12 shows a pair of locking pins 570, 572 extending through holes 514 and 516 in handle 511 of payload 510 to secure the handle 511 and top of payload 510 within the fuselage of a UAV, or to secure the handle 511 to a payload holder on a payload retrieval apparatus.

FIG. 12 shows a pair of pins 570, 572 extending through holes 524 and 526 in handle 511 of payload 510 to secure the handle 511 and top portion of payload 510 within the fuselage of a UAV, or to secure payload 510 to a payload holder of a payload retrieval apparatus. In this manner, the handle 511 and payload 510 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the handle 511 of payload 510, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

Figure 13B:
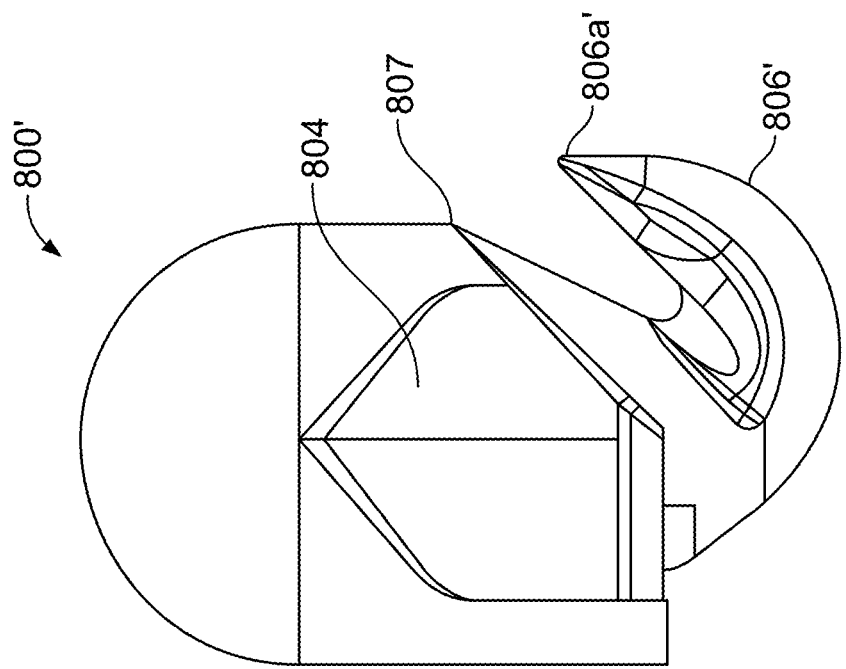
FIG. 13B is a side view of payload coupling apparatus 800' after lip 806' has been moved outwardly to facilitate engagement with a handle of a payload.
Figure 13A:
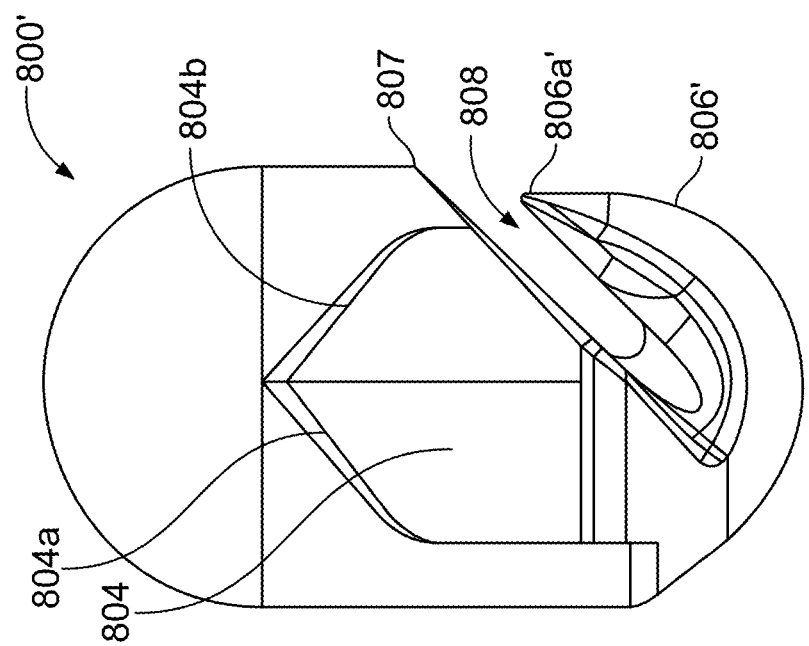
FIG. 13A is a side view of payload coupling apparatus 800' with a slot 808 positioned above lip 806', according to an example embodiment.

FIGS. 13A and 13B show various views of payload coupling apparatus or payload retriever 800' which is a variation of payload coupling apparatus 800 described above. Payload coupling apparatus 800' includes the same exterior features as payload coupling apparatus 800. However, in payload coupling apparatus 800', lower lip or hook 806' is extendable and retractable. As shown in FIG. 13A, payload coupling 800' is in a retracted state where end 806$a$' of lip or hook 806' is positioned inwardly from outer wall 807 of capsule housing 805. In FIG. 13B, payload coupling apparatus 800' is in an extended state where end 806$a$' of lip or hook 806' has been moved outwardly from capsule housing 805 such that the end 806$a$ of the lip or hook 806' is positioned outwardly from outer wall 807 of capsule housing 805. Lip of hook 806' may be moved outwardly via cams or protrusions within channel 1050, or by a spring-loaded portion of channel 1050, or other mechanisms. In the extended state shown in FIG. 13B, the hook or lip 806' is in position to easily extend through the aperture 513 in handle 511 of payload 510, such that the handle 511 is positioned within slot 808 of payload coupling apparatus 800' and retrieval of the payload and removal from the payload holder of the payload retrieval apparatus can be achieved. Once the payload 510 is removed from the payload holder the hook or lip 806' may be moved back to its retracted sate as shown in FIG. 13A.

Figure 13C:
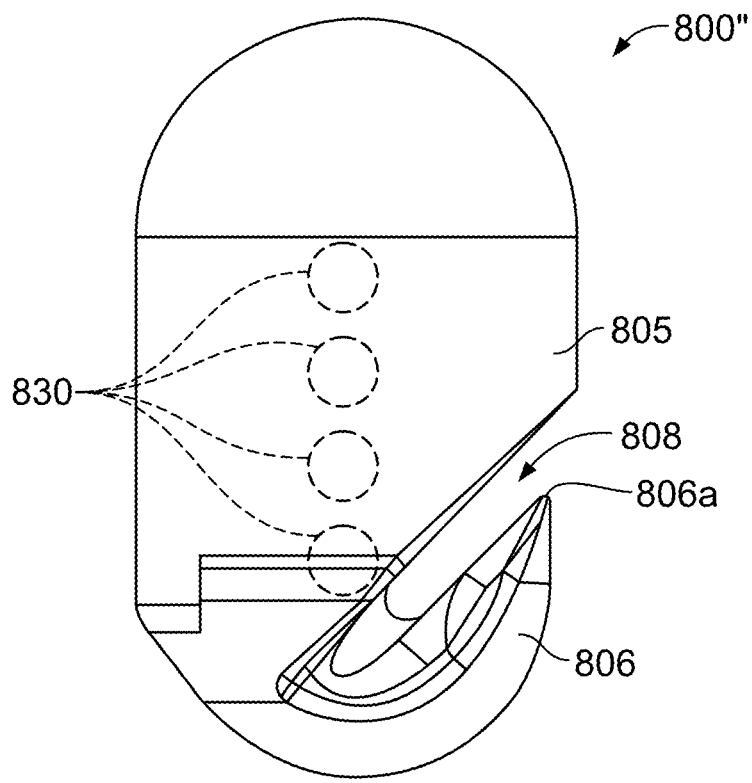
FIG. 13C is a side view of payload coupling apparatus 800" having a plurality of magnets 830 positioned thereon, according to an example embodiment.

FIG. 13C is a side view of payload coupling apparatus 800" which in this illustrative embodiment is the similar to payload coupling apparatus 800 shown in FIGS. 6A-6C, but instead includes a plurality of magnets 830 positioned thereon. The plurality of magnets 830 are adapted to magnetically engage a plurality of magnets 1060 (or a metal) positioned within the channel 1050 of a payload retrieval apparatus 1000 as shown in FIG. 20 below to orient the payload coupling apparatus 800" within the channel 1050 of payload retrieval apparatus 1000 so that the hook or lip 806$a$ is in proper position to extend through aperture 513 of handle 511 of payload 510 to effect removal of payload 510 from the payload holder of payload retrieval apparatus 1000.

Figure 13D:
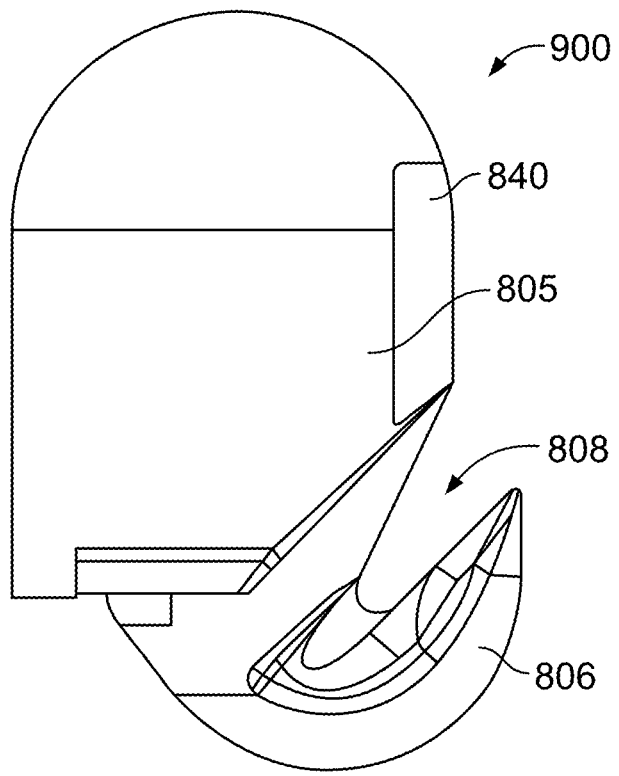
FIG. 13D is a side view of payload coupling apparatus 900 having a weighted side 840, according to an example embodiment.

FIG. 13D is a side view of payload coupling apparatus 900 which in this illustrative embodiment is similar to payload coupling apparatus 800" shown in FIG. 6C, but instead includes a weighted side 840. The weighted side 840 serves to orient the payload coupling apparatus 900 within the channel 1050 of payload retrieval apparatus 1000 so that the hook or lip 806$a$ is in proper position to extend through aperture 513 of handle 511 of payload 510 to effect removal of payload 510 from the payload holder of payload retrieval apparatus 1000.

In each of the payload coupling apparatuses 800, 800', 800", and 900 described above, the upper and lower ends are rounded, or hemispherically shaped, to prevent the payload coupling apparatus from snagging during descent from, or retrieval to, the fuselage of a UAV. Furthermore, each of payload coupling apparatuses 800, 800", and 900 may have a retractable and extendable hook or lip as is shown in FIGS. 13A and 13B with regard to payload coupling apparatus 800'.

In addition, as illustrated in FIG. 9, the payload delivery system may automatically align the top portion of the payload during winch up, orienting it for minimum drag along the aircraft's longitudinal axis. This alignment enables high speed forward flight after pick up. The alignment is accomplished through the shape of the payload hook and receptacle. In the payload coupling apparatus 800, the lower lip or hook 806 has cam features around its perimeter which always orient it in a defined direction when it engages into the cam features inside the receptacle of the fuselage of the UAV. The tips of the cam shapes on both sides of the capsule are asymmetric to prevent jamming in the 90 degree orientation. In this regard, helical cam surfaces may meet at an apex on one side of the payload coupling mechanism, and helical cam surfaces may meet at a rounded apex on the other side of the payload coupling mechanism. The hook is specifically designed so that the package hangs in the centerline of the hook, enabling alignment in both directions from 90 degrees.

Payload coupling apparatuses 800, 800', 800", and 900 include a hook 806 (or 806') formed beneath a slot 808 such that the hook also releases the payload passively and automatically when the payload touches the ground upon delivery. This is accomplished through the shape and angle of the hook slot and the corresponding handle on the payload. The hook slides off the handle easily when the payload touches down due to the mass of the capsule and also the inertia wanting to continue moving the capsule downward past the payload. The end of the hook is designed to be recessed slightly from the body of the capsule, which prevents the hook from accidentally re-attaching to the handle. After successful release, the hook gets winched back up into the aircraft.

Figure 14:
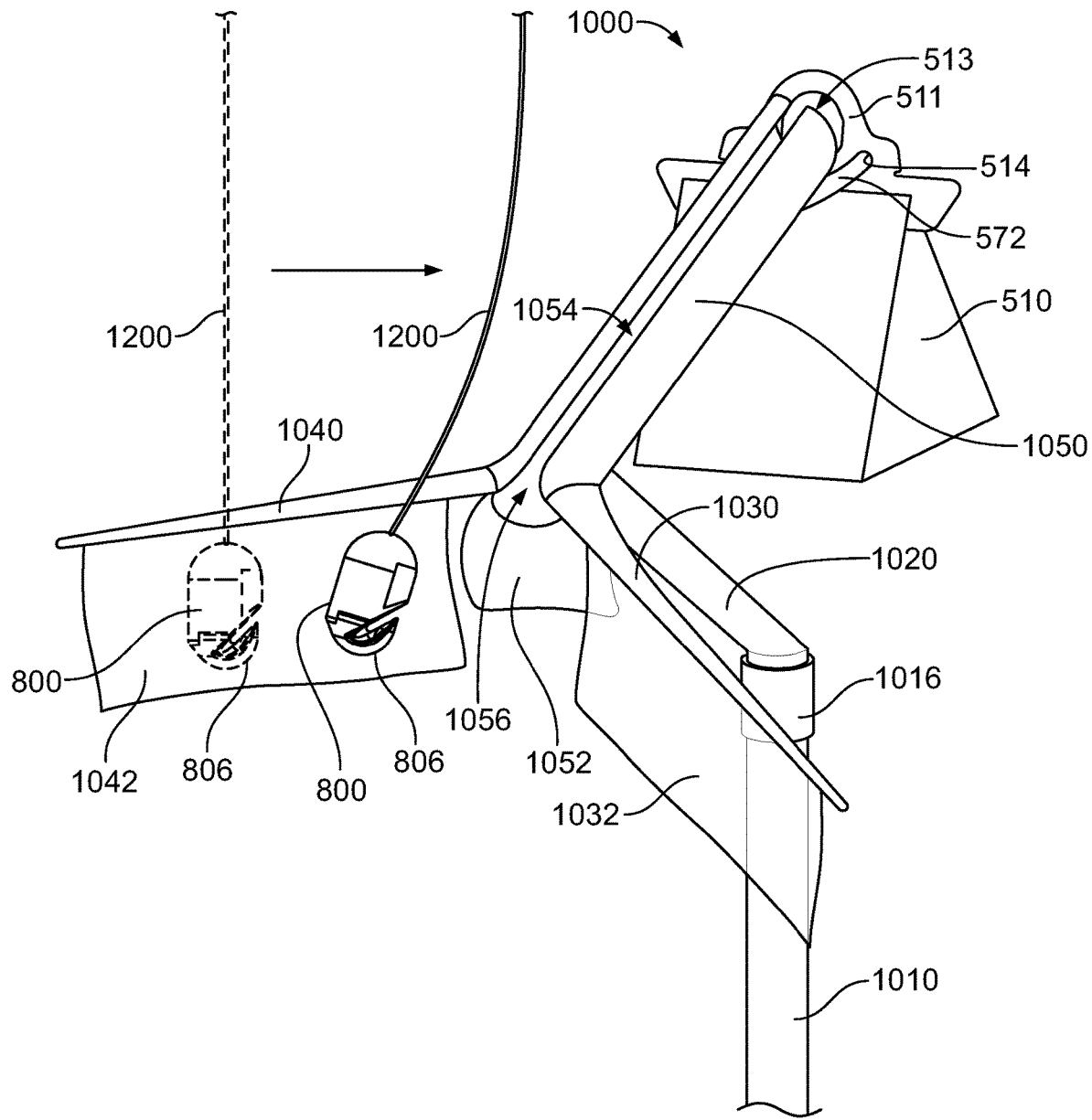
FIG. 14 is a perspective view of payload retrieval apparatus 1000 having a payload 510 positioned thereon, according to an example embodiment.
Figure 15:
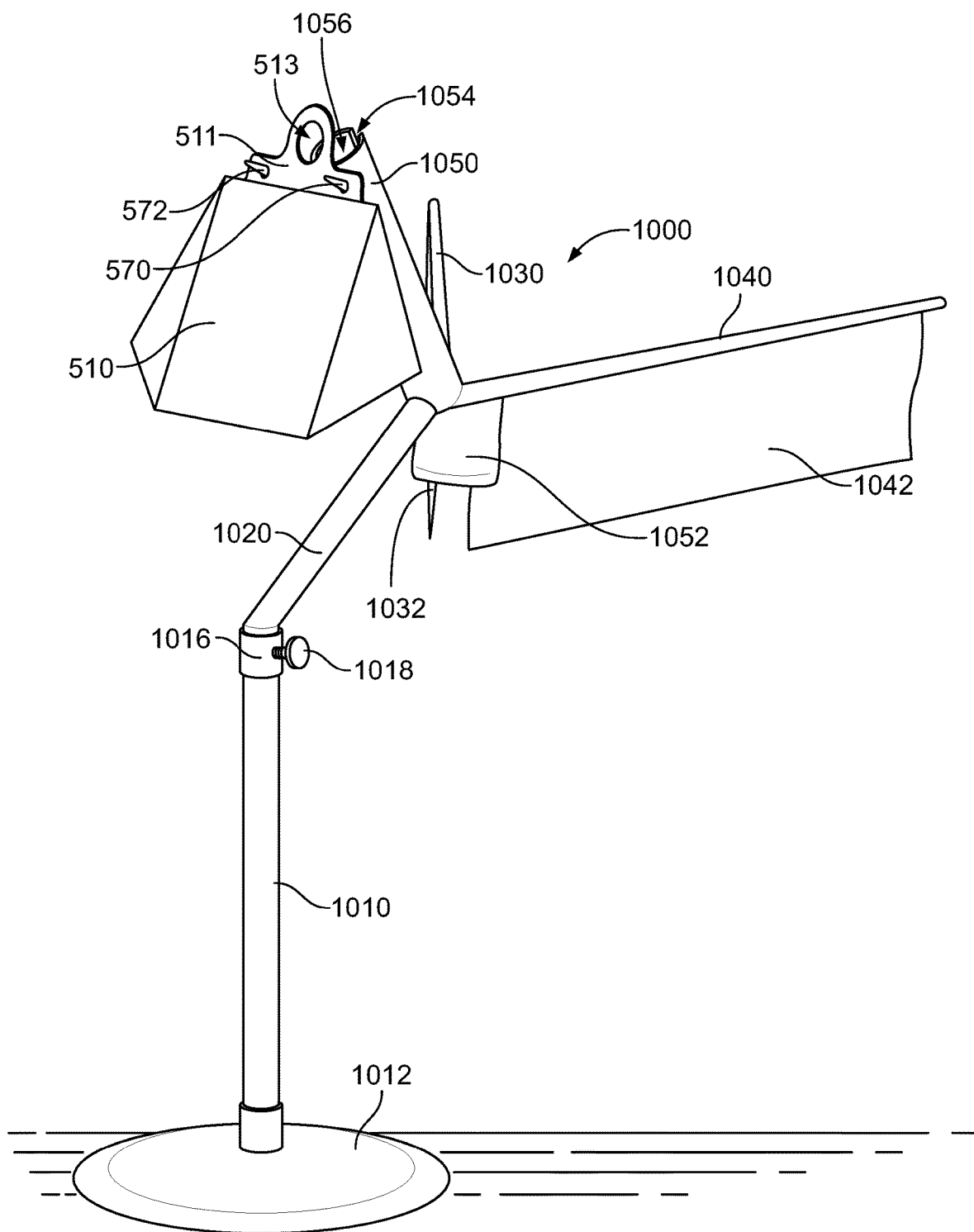
FIG. 15 is another perspective view of payload retrieval apparatus 1000 and payload 510 shown in FIG. 14.
Figure 16:
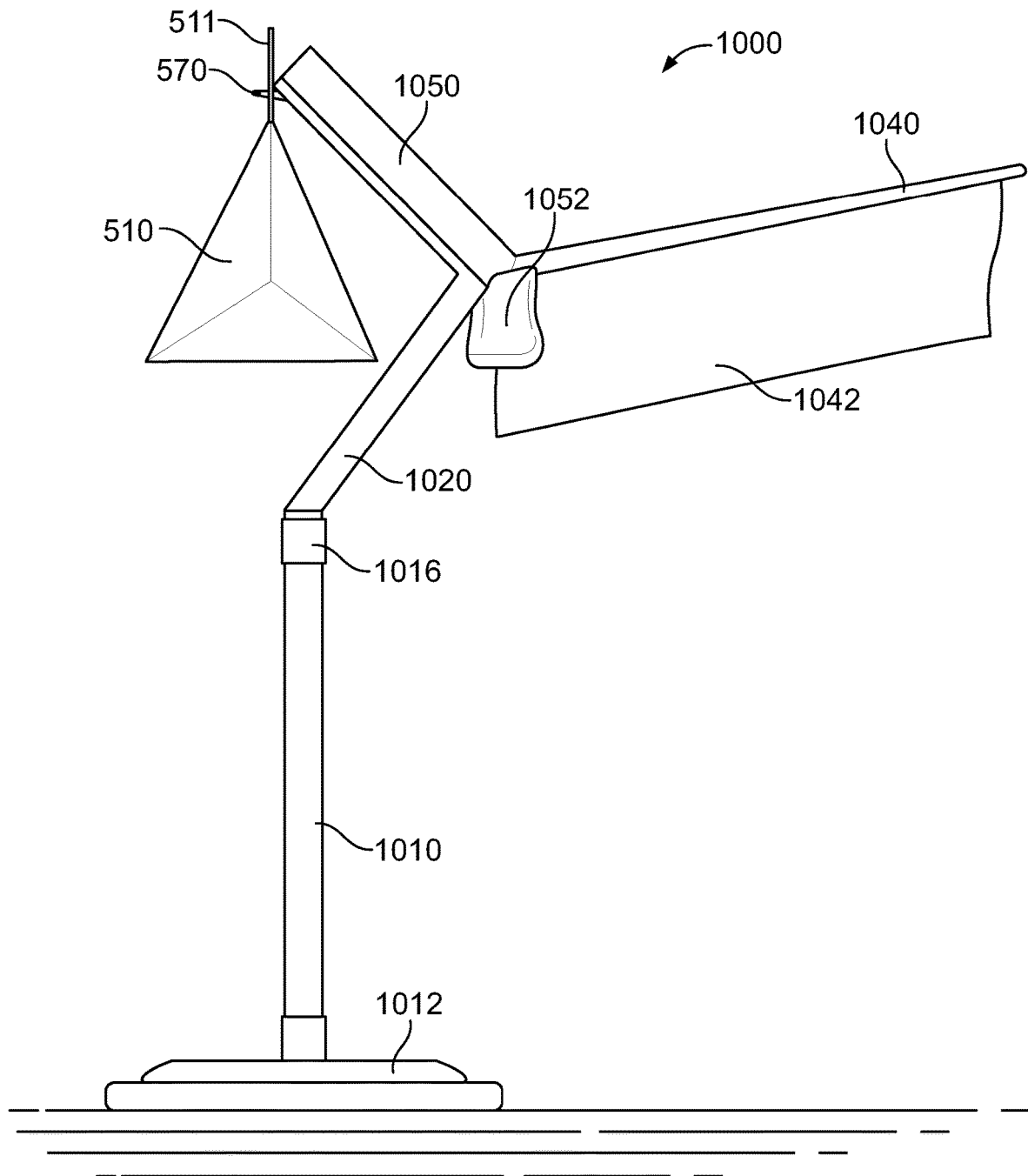
FIG. 16 is a further perspective view of payload retrieval apparatus 1000 and payload 510 shown in FIGS. 14 and 15.

FIGS. 14-16 are perspective views of payload retrieval apparatus 1000 having a payload 510 positioned thereon, according to an example embodiment. The payload retrieval apparatus 1000 may be a non-permanent structure placed at a payload retrieval site. The apparatus includes an extending member 1010 that may be secured to a base or stand 1012 at a lower end of the extending member 1010. Alternately, the extending member 1010 may have a lower end that may be positioned within a corresponding hole in the ground or hole in an apparatus positioned on the ground. The payload retrieval apparatus 1000 may be readily folded up, like an umbrella stand, to provide for ease of transport. In addition, because of its non-permanent configuration, payload retrieval apparatus 1000 may not require any type permitting, which may not be the case for a permanent device used for UAV loading and unloading.

An angled extender 1020 may be attached at an upper end of the extending member 1010, and adapter 1016 may be used to adjust the height or angle of the angled extender 1020, and having a threaded set screw with knob 1018 to set the angled extender 1020 into a desired position. The angled extender 1020 is shown with an upper end secured to a channel 1050. A first end of the channel may have a first extension or tether engager 1040 that extends in a first direction from a lower end of the channel 1050 and a second extension or tether engager 1030 that extends in a second direction from the lower end of the channel 1050. A second end of the channel 1050 may have a payload holder 570, 572 positioned near or thereon that is adapted to secure a payload 510 to the second end of the channel 1050.

A shield 1042 is shown extending from the first tether engager 1040, and another shield 1032 is shown extending from the second tether engager 1030. Shield 1042 and 1032 may be made of a fabric material, or other material such as rubber or plastic. A shield 1052 is also shown extending from the first end of channel 1050. Shields 1042, 1032, and 1052 serve to prevent a payload retriever 800 extending from an end of a tether 1200 attached to a UAV from wrapping around the tether engagers 1040 and 1032 or other components of payload retrieval apparatus 1000 when the payload retriever comes into contact with tether engagers 1040 or 1030 during a payload retrieval operation.

Channel 1050 includes a tether slot 1054 extending from a first end to a second end of the channel 1050, and the tether slot 1054 allows for a payload retriever to be positioned within the channel 1050 attached to a tether which extends through the tether slot 1054. A payload holder is shown that is a pair of pins 570, 572 that extend through openings in handle 511 of payload 510 to suspend payload 510 in position adjacent the second end of the channel 1050 ready to be retrieved by a payload retriever attached to a tether suspended from a UAV.

Figure 17:
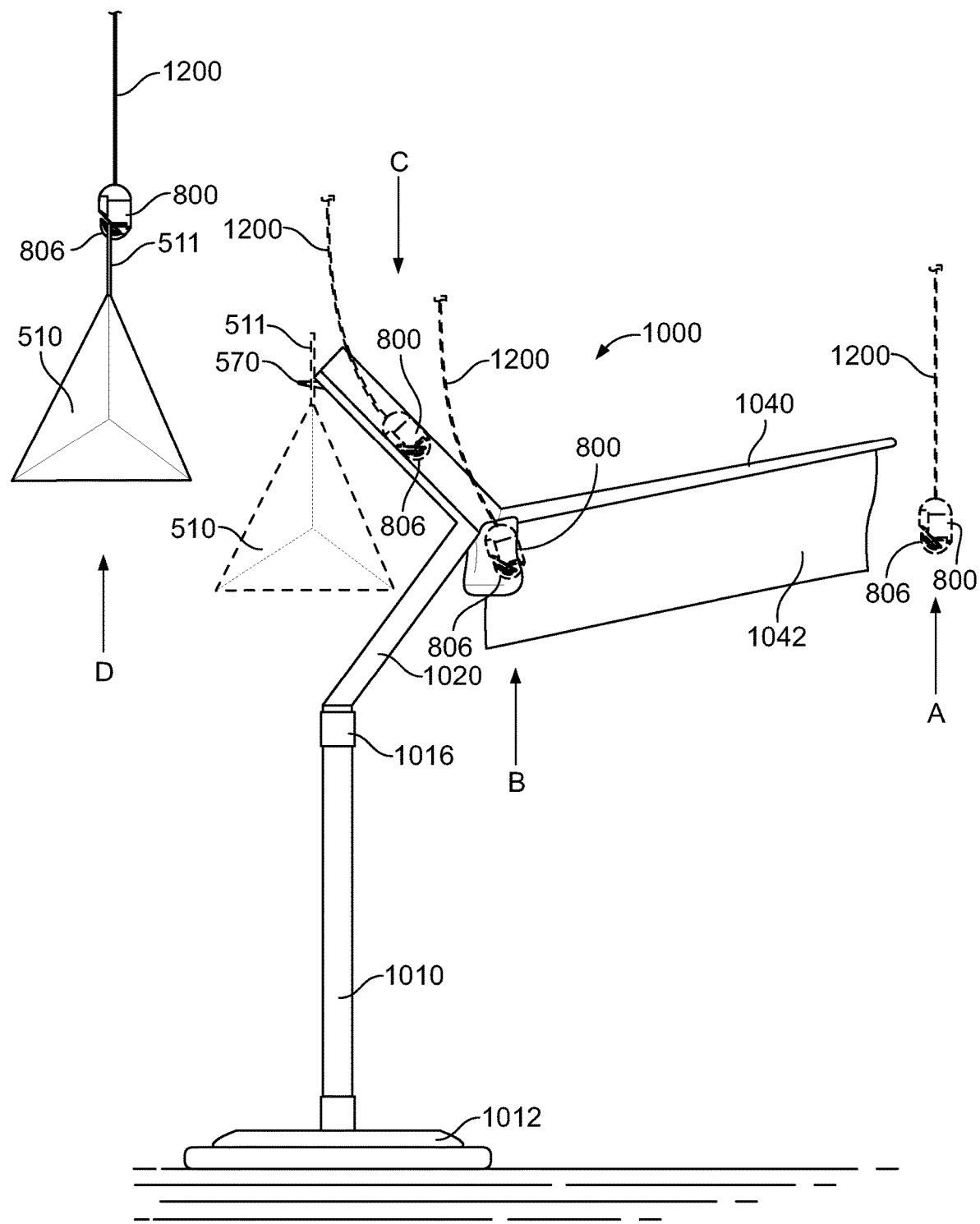
FIG. 17 shows a sequence of steps A-D performed in the retrieval of payload 510 from payload retrieval apparatus 1000 shown in FIGS. 14-16.

To provide for automatic retrieval of payload 510 with a payload retriever suspended from a UAV with a tether, payload 510 is secured to the payload holder 570, 572 on the second end of the channel 1050 at the payload retrieval site. A UAV arrives at the payload retrieval site with a tether 1200 extending downwardly from the UAV and with the payload retriever 800 positioned on the end of the tether, as shown in FIGS. 14 and 17. The UAV approaches the payload retrieval apparatus 1000, and as it nears the payload retrieval apparatus 1000, the tether 1200 comes into contact with the first or second extension (tether engager) 1040, 1030. As the UAV moves forward, or the UAV is moved upwardly, or the payload retriever is winched upwardly to the UAV while the UAV is hovering in place (or any combination thereof), the tether slides inwardly along the first or second extension 1040, 1030 where it is directed towards the first end of the channel 1050. With further forward or upward movement of the UAV, or upward winching of the payload retriever, the tether 1200 moves through the tether slot 1054 of channel 1050 and eventually the payload retriever 800 attached to the tether 1200 is pulled into the channel 1050 by the tether. The payload retriever 800 is pulled through the channel 1050 where it engages, and secures, the payload 510 secured to the payload holder 570, 572. The payload retriever 800 then pulls the payload 510 free from the payload holder 570, 572. Once the payload 510 is free from the payload holder 570, 572, the payload 510 may be winched upwardly into secure engagement with the UAV, and the UAV may continue on to a delivery site where the payload 510 may be delivered by the UAV.

FIG. 17 shows a sequence of steps A-D performed in the retrieval of payload 510 from payload retrieval apparatus 1000, shown in FIGS. 14-16. A payload retriever, shown in FIG. 17 as payload coupling apparatus 800 having a hook or lip 806 positioned beneath slot 808, is attached to an end of tether 1200 which is in turn to attached to a UAV. At point A in the sequence of steps shown from right to left, payload retriever 800 is shown suspended at the end of tether 1200 at a position below the height of tether engagers 1040 and 1030. Payload retriever 800 and tether 1200 move towards the payload retrieval apparatus 1000, where tether 1200 contacts tether engager 1040 or tether engager 1030, and tether 1200 and payload retriever 800 move towards channel 1050 until payload retriever 800 is positioned just outside of channel 1050 shown at point B in the sequence. With further forward or upward movement of the UAV, or upward winching of payload retriever 800 (or any combination thereof), tether 1200 extends through tether slot 1054 of channel 1050 and payload retriever 800 is positioned within channel 1050 as shown at point C of the sequence. With further forward or upward movement of the UAV, or upward winching of the payload retriever 800 (or any combination thereof), payload retriever 800 exits channel 1050 and hook or lip 806 of payload retriever 800 engages handle 511 of payload 510 and removes payload 510 from payload holder 570, 572 positioned on the end of the channel 1050. After removal of payload 510 from payload holder 570, 572 of payload retrieval apparatus 1000, at point D of the sequence, payload 510 is suspended from tether 1200 with handle 511 of payload 510 positioned in slot 808 above hook or lip 806 of payload retriever 800, where payload 510 may be winched up to the UAV and flown for subsequent delivery at a payload delivery site.

Figure 18:
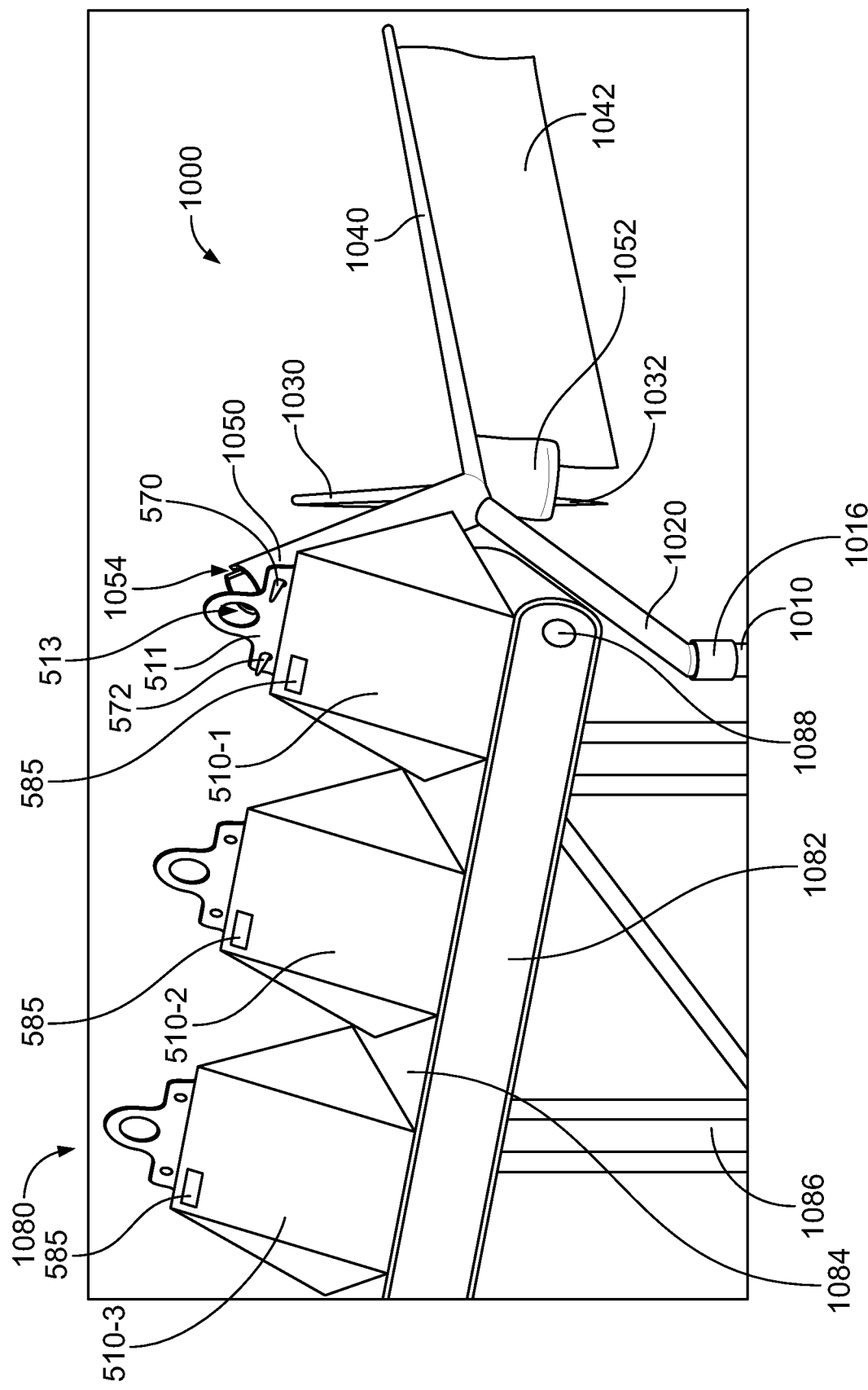
FIG. 18 is a perspective view of payload retrieval apparatus 1000 shown in FIGS. 1-17 with a payload loading apparatus 1080 having a plurality of payloads positioned thereon, according to an example embodiment.

FIG. 18 is a perspective view of payload retrieval apparatus 1000 shown in FIGS. 14-17 with a payload loading apparatus 1080 having a plurality of payloads 510-2 and 510-3 positioned thereon, according to an example embodiment. Payload loading apparatus 1080 includes a platform 1082 positioned on platform base 1086 having an upper surface 1084 that downwardly slopes towards payload retrieval apparatus 1000. Payload loading apparatus 1080 allows for automatic loading of a subsequent payload positioned on upper surface 1084 of payload loading apparatus 1080 onto payload retrieval apparatus 1000 after a payload positioned on the payload holder has been retrieved. In particular, once payload 510-1 has been removed from payload holder 570, 572 of payload retrieval apparatus 1000, subsequent payload 510-2 slides down the upper surface 1084 of the payload loading apparatus 1080 and is secured to payload holder 570, 572 of payload retrieval apparatus 1000. Payload loading apparatus 1080 may include one or more rollers 1088 that provide for the downward movement of upper surface 1084, like a conveyor belt.

As shown in FIG. 18, the handle 511 of payload 510-1 has openings 524 and 526 (see FIG. 11A) through which pins 570, 572 extend to hold payload 510-1 in position for retrieval. However, handle 511 may also include magnets 524' and 526' (see FIG. 11B) that are adapted to magnetically engage corresponding magnets or a metal positioned on the payload holder of the payload retrieval apparatus 1000. With a magnetic handle, the magnets 524' and 526' on the handle 511 move into engagement with the payload holder to hold subsequent payload 510-2 into position for subsequent retrieval as illustrated in the sequence of steps at points A-D shown in FIG. 17. In addition, payloads 510-1 through 510-3 may include fiducials 585 that may take the form of an RFID tag or bar code to identify the contents of the payload and delivery site information and/or delivery instructions. As a result, using payload loading apparatus 1080 in conjunction with payload retrieval apparatus 1000, a plurality of payloads may be retrieved from payload apparatus 1000 without the need for a person to reload subsequent payloads for retrieval, providing for further automated payload retrieval.

In order for the hook or lip 806 of the payload retriever 800 (shown in FIGS. 6A-C) to engage the handle 511 of payload 510 to effect removal and retrieval of the payload 510 from the payload retrieval apparatus 1000, the hook or lip 806 should be positioned downwardly when it exits the channel 1050 in the embodiment shown (different orientations are possible in alternate embodiments). As illustrated in FIG. 19, to ensure that the slot hook or lip 806 of the payload retriever 800 is in a proper orientation as the payload retriever 800 exits the channel 1050 and engages the handle 511 of the payload 510, the payload retriever 800 may be provided with exterior cams 804 or slots that correspond to cams or slots 1058, 1059 positioned on an interior surface of the channel 1050. The interaction of the cams 804 or slots on the payload retriever 800 and cams or slots 1058, 1059 on the interior of the channel 1050 properly orient the payload retriever 800 within the channel 1050 such that hook or lip 806 beneath the slot 808 of the payload retriever 800 is in proper position to extend through the aperture 513 on the handle 511 of the payload 510 to remove the payload 510 from the payload holder 570, 572.

FIG. 19 is a perspective view of channel 1050 of the payload retrieval apparatus 1000 shown in FIGS. 14-16 with a payload retriever 800 positioned therein. Channel 1050 includes a tether slot 1054 through which tether 1200 extends when tether 1200 draws payload retriever 800 into the interior of channel 1050. The interior of channel 1050 includes cams or slots 1058, 1059 which cooperate with cams 804 or slots on the payload retriever 800 to properly orient the hook or lip 806 and slot 808 in a downward facing position within the channel 1050. Thus, the interaction of cams or slots 1058, 1059 on the interior of channel 1050 with cams 804 or slots on the payload retriever 800 provides a desired orientation of the payload retriever 800 at the point that payload retriever 800 exits the channel 1050 and engages handle 511 of payload 510 to remove the payload 510 from the payload holder 570, 572.

Alternately, or in addition to cams 804, the payload retriever 800" may have one or more magnets 830 positioned thereon as shown in FIGS. 13C and 20 that cooperate with one or more magnets 1060, or a metal, positioned on an interior of the channel 1050 and magnetic interaction is used to properly orient the payload retriever 800" within the channel 1050 during the process of payload retrieval.

FIG. 20 is a perspective view of channel 1050 of the payload retrieval apparatus 1000 shown in FIGS. 14-16 with a payload retriever 800" positioned therein. Channel 1050 includes a tether slot 1054 through which tether 1200 extends when tether 1200 draws payload retriever 800" into the interior 1056 of channel 1050. The interior 1056 of channel 1050 includes a plurality of magnets 1060 which magnetically engage with magnets 830, or a metal, on the payload retriever 800" to properly orient the hook or lip 806 and slot 808 in a downward facing position within the channel 1050. Thus, the interaction of magnets 1060 on the interior 1056 of channel 1050 with magnets 830 or simply a metal on the payload retriever 800" provides a desired orientation of the payload retriever 800" at the point that payload retriever 800" exits the channel 1050 and engages handle 511 of payload 510 to remove the payload 510 from the payload holder 570, 572. Alternatively, or in addition, a metal strip or plurality of metal pieces could be positioned within the channel 1050 to provide for magnetic engagement with the magnets 830 on the payload retriever 800". Similarly, one or more magnets may be positioned on the interior of channel 1050 that magnetically engage a metal positioned on a payload retriever.

In addition, the payload retriever could be weighted to have an offset center of gravity (see payload retriever 900 shown in FIG. 13D) such that the hook 806 and slot 808 of the payload retriever 900 are positioned properly (with the "heavy" portion of the capsule on a lower side) to engage the handle 511 of the payload 510 and effect removal of the payload 510 from the payload holder 570, 572. The weighted side 840 of payload retriever 900 helps to insure that the hook or lip 806 and slot 808 are positioned downwardly within the channel 1050 so as to be in position for the hook or lip 806 to extend through aperture 513 in handle 511 of payload 510 during the retrieval process. It will be appreciated that the use of cams, magnets, and a weighted side could all be used separately, or used in combination in whole or in part, to provide for a desired orientation of the payload retriever within the channel to effect removal of the payload from the payload retrieval apparatus 1000.

As shown in FIG. 21A, the channel 1050 may also have an interior that tapers downwardly, or decreases in size, as the channel 1050 extends from the first end where the payload retriever enters the interior 1056 of channel 1050 to the second end where the payload retriever exits the channel 1050 to further facilitate the proper orientation of the payload retriever within the channel. In addition, as shown in FIG. 21B, the second end of the channel 1050 could be spring loaded with a spring 1061 exerting a force against outer surface 1057 of channel 1050, or operate as a leaf spring, to also facilitate the proper orientation of the payload retriever (or extension or the hook or lip of the payload retriever) at the point of payload retrieval.

Not only does the payload retrieval apparatus 1000 described above provide for automatic payload retrieval without the need for human involvement, but the UAV advantageously is not required to land for the payload 510 to be loaded onto the UAV at the payload retrieval site. Thus, the UAV may simply fly into position near the payload retrieval apparatus 1000 and maneuver itself to position the tether 1200 between the first and second tether engagers 1040, 1030, which may be aided by the use of fiducials (which could take the form of an RFID tag or bar code) positioned on or near the payload retrieval apparatus 1000 and/or an onboard camera system positioned on the UAV. Once in position, the UAV may then move forward or upward, or the payload retriever may be winched up towards the UAV (or any combination thereof) to pull the payload retriever through the channel 1050 and into engagement with the handle 511 of the payload 510 and effect removal of the payload 510. In some payload retrieval sites, landing the UAV may be difficult or impractical, and also may engage with objects or personnel when landing. Accordingly, allowing for payload retrieval without requiring the UAV to land provides significant advantages over conventional payload retrieval methods.

Furthermore, the payload retrieval apparatus 1000 is advantageously a movable, non-permanent apparatus that may be easily set up, taken down, and removed, and may be easily moved from one payload retrieval site to another. The payload retrieval apparatus 1000 preferably folds up, like an umbrella stand, to facilitate storage and transport of the payload retrieval apparatus 1000. The non-permanent nature of the payload retrieval apparatus 1000 also may eliminate the need for a permit for the payload retrieval apparatus 1000 at the retrieval site.

VII. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A payload retrieval apparatus comprising:
   an extending member having an upper end and a lower end;

a channel having a first end and a second end, the channel coupled to the extending member;

a first extension that extends in a first direction from the first end of the channel, wherein the first extension is configured to direct a tether extending from a UAV and a payload retriever attached to an end of the tether toward the first end of the channel;

wherein the second end of the channel has a payload engaging member positioned near the second end of the channel that is adapted to secure a payload; and wherein the payload retrieval apparatus is configured to cause the UAV to pick up the payload with the payload retriever while maintaining flying.

2. The payload retrieval apparatus of claim 1, wherein an angled extender is secured to the extending member and secured to the channel.

3. The payload retrieval apparatus of claim 1, wherein a first shield extends from the first end of the channel.

4. The payload retrieval apparatus of claim 1, wherein a first shield extends from the first extension.

5. The payload retrieval apparatus of claim 1, further including a second extension that extends in a second direction from the first end of the channel.

6. The payload retrieval apparatus of claim 5, wherein a first shield extends from the first extension and a second shield extends from the second extension.

7. The payload retrieval apparatus of claim 1, wherein an upper portion of the channel includes a tether slot that extends from the first end of the channel to the second end of the channel.

8. The payload retrieval apparatus of claim 7, wherein the channel has an interior having cams or slots adapted to cooperate with external cams or slots on the payload retriever attached to the end of the tether suspended from the UAV, to orient the payload retriever within the channel.

9. The payload retrieval apparatus of claim 7, wherein one or more magnets or a metal are positioned on an interior of the channel adapted to magnetically engage one or more magnets positioned on an exterior of the payload retriever, to orient the payload retriever within the channel.

10. The payload retrieval apparatus of claim 7, wherein the payload retrieval apparatus is configured to accept the payload retriever attached to an end of the tether suspended from a UAV, wherein the payload retriever has a weighted side to orient the payload retriever within the channel.

11. The payload retrieval apparatus of claim 1, wherein the payload engaging member comprises a pair of pins adapted to extend through openings in a handle of the payload.

12. The payload retrieval apparatus of claim 1, wherein the payload engaging member comprises one or magnets, or a metal, adapted to magnetically engage one or more magnets, or a metal, positioned on the payload.

13. The payload retrieval apparatus of claim 1, wherein a handle of the payload includes one or more magnets adapted to engage a metal on the payload engaging member.

14. The payload retrieval apparatus of claim 1, wherein the handle of the payload includes an aperture positioned over the second end of the channel configured for engagement with the payload retriever when the payload retriever exits the second end of the channel.

15. A system for payload retrieval comprising:
a payload retrieval apparatus comprising:
a channel having a first end and a second end;
a first extension that extends in a first direction from the first end of the channel, wherein the first extension is configured to direct a tether extending from a UAV and a payload retriever attached to an end of the tether towards the first end of the channel;
wherein the second end of the channel has a payload engaging member adapted to secure a payload;
wherein the system is configured to cause the UAV to pick up the payload with the payload retriever while maintaining flying; and
wherein the channel includes a tether slot that extends from the first end of the channel to the second end of the channel, the tether slot configured to guide passage of the tether coupled to the payload retriever when the payload retriever is passing within the channel.

16. The system of claim 15, wherein the first extension and the channel may be folded to facilitate transport and storage of the payload retrieval apparatus.

17. The system of claim 15, wherein the payload retriever has a weighted side to orient the payload retriever within the channel.

18. The system of claim 15, wherein the second end of the channel is spring-loaded to further assist orienting the payload retriever within the channel.

19. The system of claim 15, wherein the payload comprises a handle with an aperture, the payload secured to the payload engaging member;
wherein the payload retriever is attached to the tether that is suspended from the UAV; and
wherein the tether slot has a width that is narrower than a width of the payload retriever;
and wherein the aperture of the handle is positioned over the second end of the channel.

20. A method of a retrieving a payload with a UAV, comprising:
positioning a payload having a handle with an aperture on a payload engaging member coupled to a channel on a payload retrieval apparatus;
causing a UAV having a payload retriever attached to a tether suspended from the UAV to position the tether to come into contact with a first extension extending from an end of the channel;
causing the UAV to advance the tether into a tether slot positioned on a top of the channel, wherein the tether slot has a width that is narrower than a width of the payload retriever;
causing the UAV to advance the payload retriever into the channel;
causing the UAV to advance the payload retriever until the payload retriever engages the handle of the payload; and
causing the UAV to pick up the payload by the payload retriever thereby disengaging the payload from the payload engaging member.

* * * * *